(12) United States Patent
Adler et al.

(10) Patent No.: US 12,284,570 B2
(45) Date of Patent: *Apr. 22, 2025

(54) LOCATION DATA BASED INTELLIGENCE FOR SUPPLY CHAIN INFORMATION PLATFORMS

(71) Applicant: SOURCEWATER HOLDINGS LLC, Oklahoma City, OK (US)

(72) Inventors: Joshua Adler, Houston, TX (US); Jon Stowell, South Jordan, UT (US)

(73) Assignee: Sourcewater Holdings, LLC, Oklahoma City, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/178,074

(22) Filed: Mar. 3, 2023

(65) Prior Publication Data

US 2024/0040335 A1  Feb. 1, 2024

Related U.S. Application Data

(63) Continuation of application No. 17/532,505, filed on Nov. 22, 2021, now Pat. No. 11,601,785, which is a (Continued)

(51) Int. Cl.
*H04W 24/00* (2009.01)
*H04W 4/029* (2018.01)

(52) U.S. Cl.
CPC .................. *H04W 4/029* (2018.02)

(58) Field of Classification Search
CPC . H04W 24/10; H04W 16/28; H04W 28/0221; H04W 52/0229; H04W 52/0245; H04W 52/0251; H04W 52/0274; H04W 52/028; H04W 24/08; H04W 72/046; H04W 48/14; H04W 56/0045;
(Continued)

(56) References Cited

U.S. PATENT DOCUMENTS 6,681,247 B1  4/2004  Payton
7,336,078 B1  2/2008  Merewether et al.
(Continued)

OTHER PUBLICATIONS

Xiao, et al., "A New Method for Discovery of Vegetation Changes based on the Satellite Ground Photographs", 2015 8th Internation Processing (CISP 2015), pp. 851-856.

*Primary Examiner* — Joseph Arevalo
(74) *Attorney, Agent, or Firm* — Medler Ferro Woodhouse & Mills PLLC

(57) ABSTRACT

Systems and methods are described for determining job classifications of anonymous users. Energy Infrastructure (EI) information associated with a known EI facility and anonymized location tracking data is obtained. The EI facility information includes a location of the known EI facility and an identification of the known EI facility, and the anonymized location tracking data includes visited locations associated with an anonymous user ID. A job classification is associated with the anonymous user ID based on a correlation between the visited locations, the location of the known EI facility, and the identification of the known EI facility. Location tracking data associated with a user of a known job classification can be used to identify a previously unknown EI facility.

18 Claims, 11 Drawing Sheets

Related U.S. Application Data continuation of application No. 17/145,892, filed on Jan. 11, 2021, now Pat. No. 11,184,740.

(60) Provisional application No. 62/994,505, filed on Mar. 25, 2020.

(58) Field of Classification Search
CPC . H04W 64/00; H04W 72/23; H04W 74/0833; H04W 76/18; H04W 84/042
USPC ...... 455/435.1, 522, 418, 132, 456.1, 456.2, 455/456.3, 446, 574, 67.11, 419
See application file for complete search history.

(56) References Cited

U.S. PATENT DOCUMENTS

| | | | |
|---|---|---|---|
| 9,389,084 | B1 | 7/2016 | Chen et al. |
| 10,339,646 | B1 | 7/2019 | Adler |
| 10,346,725 | B2 | 7/2019 | Weller et al. |
| 10,367,677 | B2 * | 7/2019 | Parkvall ............... H04W 24/10 |
| 10,400,551 | B2 | 9/2019 | Murr et al. |
| 10,460,169 | B1 | 10/2019 | Adler |
| 10,460,170 | B1 | 10/2019 | Adler |
| 10,467,473 | B1 | 11/2019 | Adler |
| 10,534,961 | B2 | 1/2020 | Rostand et al. |
| 11,184,740 | B2 | 11/2021 | Adler et al. |
| 11,392,625 | B2 | 7/2022 | Strong et al. |
| 2001/0051930 | A1 | 12/2001 | Nakamura |
| 2002/0019764 | A1 | 2/2002 | Mascarenhas |
| 2006/0122776 | A1 | 6/2006 | Knowles et al. |
| 2007/0025595 | A1 | 2/2007 | Koizumi et al. |
| 2009/0177458 | A1 | 7/2009 | Hochart et al. |
| 2011/0082824 | A1 | 4/2011 | Allison et al. |
| 2013/0157737 | A1 | 6/2013 | Daly |
| 2013/0170694 | A1 | 7/2013 | Thornberry et al. |
| 2013/0226667 | A1 | 8/2013 | Terrazas et al. |
| 2014/0359466 | A1 | 12/2014 | Wan |
| 2015/0127565 | A1 | 5/2015 | Chevalier et al. |
| 2015/0221079 | A1 | 8/2015 | Schultz et al. |
| 2015/0269720 | A1 | 9/2015 | Mondello |
| 2015/0302253 | A1 | 10/2015 | Stewart |
| 2016/0026640 | A1 | 1/2016 | Hart et al. |
| 2016/0180197 | A1 | 6/2016 | Kim et al. |
| 2016/0275801 | A1 | 9/2016 | Kopardekar |
| 2016/0285981 | A1 | 9/2016 | Morton et al. |
| 2016/0343124 | A1 | 11/2016 | Sundheimer et al. |
| 2017/0200090 | A1 | 7/2017 | Hershey et al. |
| 2017/0235848 | A1 | 8/2017 | Van Dusen et al. |
| 2017/0331670 | A1 * | 11/2017 | Parkvall ............... H04B 7/0617 |
| 2017/0337524 | A1 | 11/2017 | Durand et al. |
| 2017/0358068 | A1 | 12/2017 | Strebel et al. |
| 2017/0366992 | A1 * | 12/2017 | Rune ................... H04B 7/0617 |
| 2018/0132125 | A1 * | 5/2018 | Li .......................... H04W 24/10 |
| 2018/0176801 | A1 * | 6/2018 | Rune ................... H04B 7/0695 |
| 2018/0218214 | A1 | 8/2018 | Pestun et al. |
| 2018/0239991 | A1 | 8/2018 | Weller et al. |
| 2018/0260626 | A1 | 9/2018 | Pestun et al. |
| 2018/0336693 | A1 | 11/2018 | De Franchis et al. |
| 2019/0050625 | A1 | 2/2019 | Reinstein et al. |
| 2019/0082334 | A1 * | 3/2019 | Nagaraja ............... H04B 7/088 |
| 2019/0130641 | A1 | 5/2019 | Hernandez et al. |
| 2019/0132778 | A1 * | 5/2019 | Park ..................... H04W 36/30 |
| 2019/0380128 | A1 * | 12/2019 | Park ..................... H04W 48/20 |
| 2019/0384975 | A1 | 12/2019 | Rostand et al. |
| 2020/0028745 | A1 * | 1/2020 | Parkvall ............... H04W 24/10 |
| 2020/0044708 | A1 * | 2/2020 | Da Silva ............. H04W 72/543 |
| 2020/0167763 | A1 | 5/2020 | Robins |
| 2022/0086599 | A1 | 3/2022 | Adler et al. |

* cited by examiner

LOCATION DATA BASED INTELLIGENCE FOR SUPPLY CHAIN INFORMATION PLATFORMS

RELATED APPLICATIONS

This application is a continuation of prior U.S. application Ser. No. 17/532,505, filed Nov. 22, 2021, now U.S. Pat. No. 11,601,785, which is a continuation of prior U.S. application Ser. No. 17/145,892, filed Jan. 11, 2021, now U.S. Pat. No. 11,184,740, issued Nov. 23, 2021, which claims the benefit of prior filed U.S. Appl. No. 62/994,505, filed Mar. 25, 2020 all of which are hereby incorporated by reference in their entirety for all purposes.

TECHNICAL FIELD

The present invention generally relates to the use of anonymized location data pertaining to mobile devices and the use of the data in conjunction with other existing information relevant to a site or a location (for example, an oilfield region) to determine new information about the site or location or about the job function of the user ID of the mobile devices in and around the site or location.

BACKGROUND

Commercial participants in the energy industry are often subdivided into three categories: upstream, downstream, and midstream. These designations reflect their overall position in the supply chain. For example, in the oil and gas industry, upstream companies are those that discover and extract oil and gas via drilling operations. Downstream companies are those that process the oil and gas (e.g. at refineries) into end products or intermediate products, and which may market and distribute those products for eventual sale. Midstream companies serve as a linkage between the upstream and downstream parts of the process. These assist for example with the storage and transportation of fluids between its points of (upstream) production and (downstream) refinement. Some integrated oil and gas companies may combine upstream, downstream, or midstream activities, whereas others may focus on one of these categories.

Hydraulic fracturing, or fracking, is the process of injecting a hydraulic liquid such as water or gel into shale rock under pressure to create or expand cracks to facilitate the extraction of subterranean natural gas and oil. Use of this technique has grown rapidly in recent years.

Water is not only needed to initiate the fracturing process (the injectate), but may also often be recovered, produced, or released as part of the operation. This water may be a return of the injected water or may be underground water that is released as a result of the fracturing. The quantity of the returned water may often be large, for example, exceeding by far the quantity of oil obtained from the well.

In oilfield regions, information pertaining to new or existing oilfield sites, facilities, or infrastructure (herein "oilfield features") is of significant interest to many parties within the oil and gas industry. These parties may be, for example, oilfield operators, water or crude oil transportation companies, equipment suppliers, financial institutions and so on. In some examples, the information may include any characteristic of the oilfield feature (such as a type, a location, an ownership, or a size), a status of the oilfield feature (such as capacity or productivity), a development status of the oilfield feature or an operational status of the oilfield feature. In other examples, the information may include an activity determined to be ongoing at the location of the feature or between features, or a level of that associated activity.

More generally, for a given energy resource type, constituent components of the infrastructure (hereon termed "Energy Infrastructure features" and abbreviated to "EI features") are often proximally-located to one another within the same locale or geographical region, for example at an oilfield site, a solar power station, a wind farm or a hydroelectric station. A collection of related EI features may be referred to as an "EI facility." Information about the presence or status of a developing solar power station, wind farm or hydroelectric EI feature or facility, which may be determined for example by the movement of people and goods between the EI feature and other EI features or known locations, may be useful for other parties such as suppliers of associated services, equipment, or infrastructure. More accurate or timely information about EI features may allow parties to become aware of present or upcoming opportunities, and such awareness may be taken into account in their commercial planning.

SUMMARY

The present invention generally relates to systems and methods for determination of job functions of anonymous users based on location data associated with the anonymous user IDs, and/or using location data associated with anonymous user IDs of users with identified job functions to provide intelligence about energy infrastructure features or their characteristics.

In an example implementation, a computer implemented method of determining job classifications of anonymous users is described. The computer implemented method includes obtaining Energy Infrastructure (EI) information associated with a known EI feature or facility, the EI feature or facility information including a location of the known EI feature or facility and an identification of the known EI feature or facility, obtaining anonymized location data, the anonymized location data including visited locations associated with an anonymous user ID, and associating a job classification with the anonymous user ID based on a correlation between the visited locations, the location of the known EI feature or facility, and the identification of the known EI feature or facility. For example, the computer implemented method may determine that an anonymous user ID undertakes regular trips between two locations. Based on associating EI features or facilities with the two locations and optionally information associated with trips undertaken by the anonymous user ID, the computer implemented method may classify the anonymous user ID as a transportation truck driver.

In some implementations, the computer implemented method includes determining, based on the visited locations and the job classification of one or more anonymous user IDs, new EI feature or facility information associated with a previously unknown EI feature or facility. In examples, the new EI feature or facility information includes a location of the previously unknown EI feature or facility. The new EI feature or facility information may include an identification of the previously unknown EI feature or facility. For example, the computer implemented method may also determine that one or more anonymous user IDs for which the job classification is known undertakes regular trips between two locations, with one location being a known EI feature or facility. Based on information of the one location being a known EI feature or facility, the computer implemented method may determine that the other location is likely to be a new unknown EI feature or facility.

In some implementations, the computer implemented method includes obtaining additional visited locations associated with the anonymous user ID as part of the anonymized location data, and determining, based on the additional visited locations and the job classification of the one or more anonymous user IDs, new EI feature or facility information associated with a previously unknown EI feature or facility, the new EI feature or facility information including a location of the previously unknown EI feature or facility.

In some implementations, the computer implemented method includes determining a development status of the known EI feature or facility based on the job classification of one or more anonymous user IDs, the visited locations of the one or more anonymous user IDs, the location of the known EI feature or facility, and the identification of the known EI feature or facility.

In some implementations, the computer implemented method includes determining an amount of resource extracted by, produced by, disposed by, or delivered to the known EI feature or facility based on the job classification of one or more anonymous user IDs, the visited locations of the one or more anonymous user IDs with that job classification, the location of one or more known EI features or facilities, and the identification of the one or more known EI features or facilities. For example, considering the above example of the transportation truck driver job classification, the computer implemented method may determine a capacity of the truck and may determine based on location data associated with the one or more anonymous user IDs that are associated with the job classification "transportation truck driver," a number of trips per day to or from the known EI feature or facility or between known EI features or facilities. Based on the truck capacity, the number of anonymous user IDs with the job classification "transportation truck driver" and number of trips per day to or from the known EI feature or facility or between known EI features or facilities, the computer implemented method may determine production of one or more of the known EI features or facilities. In examples based on tracking production in the one or more known EI features or facilities over a period of time, the computer implemented method may determine the capacity of the one or more known EI features or facilities. In examples, the computer implemented method may determine the capacity or productivity of a known EI feature that is associated with a known EI facility.

Productivity or production, as used herein, may refer to the amount of one or more goods, substances, or other materials that are brought into or removed from a site. For example, a productivity of a mine may be measured according to an amount or extracted resources taken from the mine, productivity of a disposal well may be measured according to an amount of water received and disposed of, productivity of an oil well may be measured according to one or both of an amount of produced water and/or hydrocarbons extracted.

In some implementations, the computer implemented method includes determining a method of fluid transport employed at known EI features or facilities based on the job classification of anonymous user IDs, the visited locations of the anonymous user IDs of known job classifications, the location of the known EI features or facilities, the identification of the known EI features or facilities, and an amount of resource produced by the known EI features or facilities.

In some implementations, the computer implemented method includes generating an analysis of the visited locations of the anonymous user IDs of known job classifications over time, and determining productivity of an EI feature associated with the known EI facility based on the job classification of the anonymous user IDs, the analysis of the visited locations over time, the location of the known EI facility, the identification of the known EI facility and an amount of resource extracted or produced by the known EI facility.

In some implementations, the computer implemented method includes generating an analysis of the visited locations of the anonymous user IDs of known job classifications over time and determining a demand for services at an EI facility associated with the known EI feature based on the job classification of the anonymous user IDs, the analysis of the visited locations over time, the location of the known EI feature, and the identification of the known EI feature.

In some implementations, the computer implemented method includes obtaining non-anonymized location data, and obtaining a known job classification of a non-anonymous user ID associated with the non-anonymized location data, wherein associating a job classification with the anonymous user ID may be based on a correlation between the visited locations of the anonymous user ID and visited locations of the non-anonymous user ID. For example, using the above example, the computer implemented method may determine that there are trips made around (or locations visited in) EI facilities by one or more anonymous user IDs that are substantially similar to trips made around (or locations visited in) the EI facilities by the non-anonymous user ID. Based on similarity and correlation in trips and visited locations between the one or more anonymous user IDs with non-anonymous user ID, the computer implemented method may associated a job classification with an anonymous user ID, for example the method may determine that the anonymous user ID is a transport truck driver.

In some implementations, the computer implemented method includes determining a geofence associated with the known EI feature or facility. In examples, a user is considered to have visited the known EI feature or facility if the user crosses the geofence associated with the known EI feature or facility. In some implementations, the computer implemented method includes determining a user dwell time within a geofence based on the visited locations of the location data associated with the user ID. In examples where the user ID is an anonymous user ID, the computer implemented method includes associating a job classification with the anonymous user ID based on the dwell time within the geofence.

In some implementations, the computer implemented method includes determining a geofence associated with the known EI feature or facility and determining a frequency of the visited locations of the location data associated with a user ID occurring within the geofence. In examples where the user ID is an anonymous user ID, associating a job classification with the anonymous user ID is further based on the frequency of visited locations occurring within the geofence.

Other aspects and advantages of the invention will become apparent from the following detailed description, taken in conjunction with the accompanying drawings, which illustrate by way of example the principles of the invention.

DETAILED DESCRIPTION

Figure 1A:
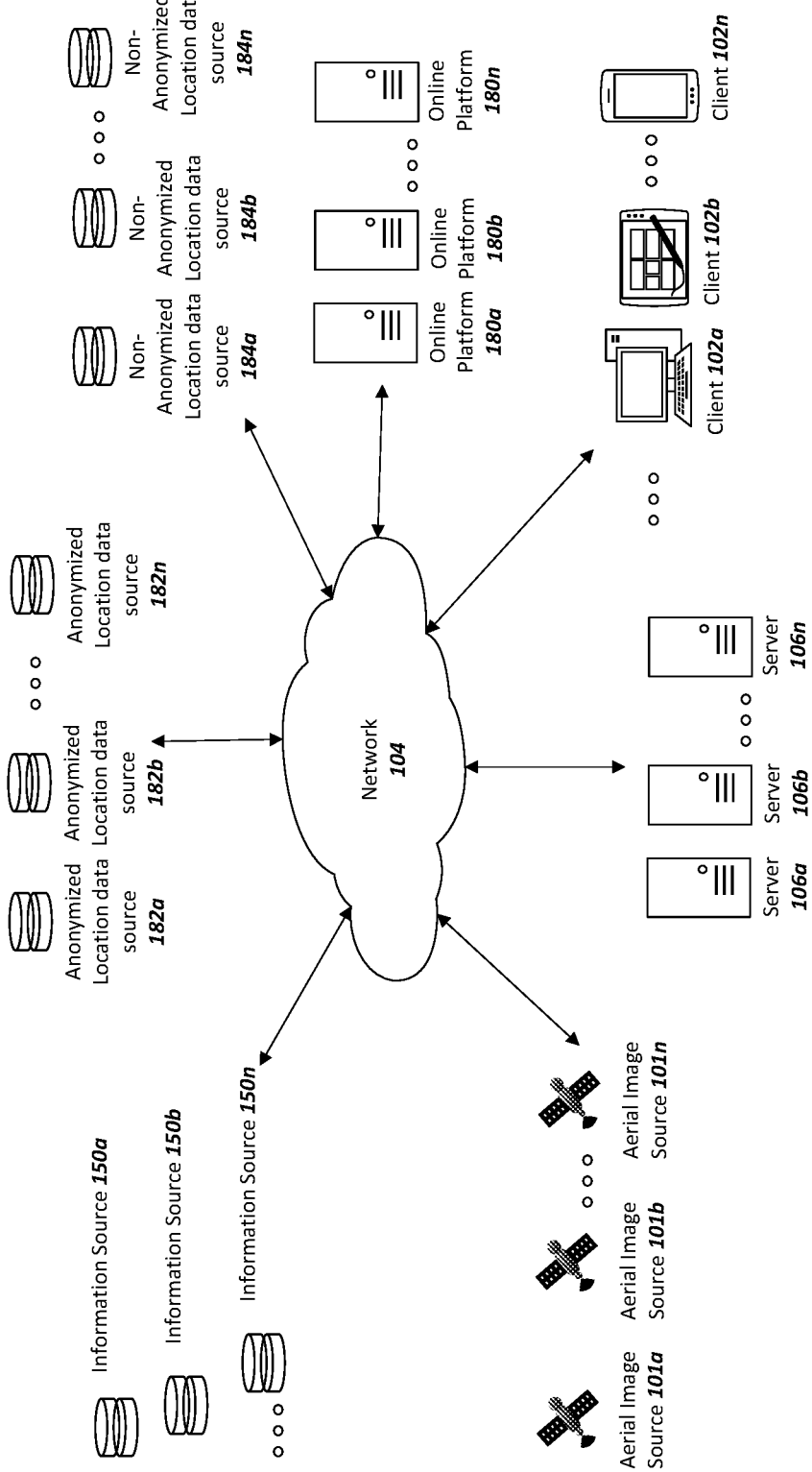
FIG. 1A is a block diagram depicting an embodiment of a network environment comprising client devices in communication with online platform devices, information storage devices, and server devices, according to some embodiments.

The following disclosure describes various embodiments that correlate anonymous location data with Energy Infrastructure (EI) feature information to identify existence, characteristics and status of EI features, relationships between EI features, and activity at or between EI features. The disclosure also describes the use of the location of user IDs with identified job classifications to provide intelligence or characteristics of EI features. EI features include various types of infrastructure required to harvest energy from natural resources, such as hydrocarbons (for example oil and gas), solar radiation, wind and hydroelectric sources. In some examples, EI features could include: an EI feature development site; a frac-water pit, frac pond or frac water impoundment, a salt water disposal station, a midstream processing facility, a well pad, a drilling rig, pipeline infrastructure, a service road, other roads, a clearing, a vehicle or truck, a fluid tank battery, a proppant store, a drilling reserve pit, a frac spread, a sand store, a sand mine, a producing well, a flare system, solar panel mounts, solar panels, an electrical substation, a security fence, a building, a cable system, a wind energy collector, meteorological monitoring equipment, geothermal facilities, carbon capture facilities, construction equipment, hydroelectric reservoirs or forebays, hydroelectric intake structures, penstocks, surge chambers, a hydroelectric power house, or a hydroelectric tailrace. Although the disclosure describes various embodiments using an example EI feature which is an oilfield facility, one can appreciate that that embodiments equally apply to other EI features as described above and throughout the disclosure.

The nature of the fracturing process brings about a requirement not only to source large amounts of water at the outset of a project, but also to dispose of or treat and recycle water during the project or upon its completion. Vehicular transportation of water from one place to another, such as from a water source to an oilfield facility, from one oilfield facility to another, from an oilfield facility to a disposal or storage facility, or to provide interconnection of sites or facilities to existing or fixed pipeline networks, may incur significant costs and thereby reduce the available margin for profit during production. Costs associated with vehicular transportation include fuel, labor, vehicular maintenance, repair and depreciation in vehicular asset value. Additionally, the capacity or rate by which a fluid may be transported by vehicular means is limited. The practicality and expense of vehicular transportation of fluids may quickly become prohibitive for larger fluid volumes and inter-site distances. Such issues may be further compounded in cases where the intervening terrain between fluid transportation start and destination locations has poor vehicular access or road conditions. Costs associated with vehicular transportation of fluids such as oilfield water may be mitigated to some degree by identifying and selecting water source, disposal or treatment options that are geographically local to an oilfield facility or which can be easily accessed from the oilfield facility.

In some examples, to overcome the challenges and costs associated with regular vehicular transportation of large volumes of fluids between specific oilfield facilities, pipelines may be laid or installed to achieve the transfer of fluids in a more cost effective and efficient manner. The laying of such a pipeline incurs financial costs associated with its installation, operation and maintenance and eventual dismantlement. Even so, the use of pipeline-based (as opposed to vehicular-based) transportation of fluids may often be a more cost-effective solution, especially for larger fluid transportation capacities and distances. For short- or medium-term projects, a pipeline may be temporary and may be left in place as long as the volume of fluids transferred meets a threshold and may be dismantled after project completion whereby the vehicular transportation of fluids is resumed. A pipeline may interconnect any suitable fluid transportation start and destination locations, including places of fluid use or production (such as oilfield drilling sites), fluid sources, fluid storage or disposal facilities, fluid treatment or recycling facilities and fixed or permanent pipeline networks or infrastructure.

Aerial images such as from a satellite, drone or manned aircraft may be processed to determine the locations and types of various EI features. The processing of aerial images may be performed by humans, or may be automated, for example using machine learning methods or artificial intelligence to detect, identify or classify EI features and their types. Accurate and timely identification of an eventual EI feature may be enhanced by combining information from other sources, as is described in detail in U.S. Pat. Nos. 10,726,263, 10,460,169, 10,339,646, US and U.S. Pat. No. 10,460,170, each of which is incorporated herein.

Throughout the energy production industry, various regulations require the generation and submission of reports, such as compliance reports, completion reports, status reports, etc. Such reports frequently become public information. In some examples related to oilfield facilities in some regulatory jurisdictions, the oil and gas industry, on completion of making a well ready for production or injection, must submit a completion report with the relevant regulatory commission within a prescribed time period and which comprises various data regarding the well and its construction. Data included within a completion report may include, for example, an identification of the field or reservoir, a lease number, an approximate location, the type of well, any associated permit dates, results from test data such as oil or water production rates, technical data regarding the casing or tubing construction and related pressures, producing or injection depth intervals and information regarding the geological formation to which the well is connected. During operation and active production of a well, the well operator may be required to regularly file reports regarding the amount of water and oil/condensate that is produced. A disposal well operator may be required to regularly file reports regarding the amount of water and oil/condensate that is received by them per lease from producing wells. These or similar production and completion reports may be reported a considerable time after the completion or production activity actually occurs, making them less useful for providing commercial insights. In some situations, a lease may encompass multiple wells which may be geographically dispersed. As reporting may be done per lease and not per well, such production reports may not specify the volume of fluid transported between specific oilfield facilities and hence would not provide useful commercial insights. Similar drawbacks to publicly reported information in other energy industries also exist.

Non-anonymized location data represents one form of personal data that is specific to a user and hence care is needed in how this data is handled. Anonymized location data aggregated across a large population of mobile devices may provide useful insights and help to enable new services and information. Anonymized location data does not comprise personally identifiable information, such as an identifier (ID) or name. Instead, the anonymized location information for a given mobile device may be associated with a randomly selected, or otherwise arbitrary identifier. These arbitrary identifiers may be either persistent (e.g. retain a fixed association to a given user or mobile device and remain the same from one day to the next), or may be temporary and hence reassigned on a more frequent basis (e.g. the arbitrary identifier associated with a given user or mobile device may change on a daily basis). The location data may be collected either directly from the mobile devices, or from networks to which the devices are connected.

Energy infrastructure information, such as knowledge regarding the development of energy infrastructure sites and their current activities, is useful to multiple industry players including operators, suppliers of equipment and materials, transportation providers, financial institutions and so forth. However, little information is made publicly available, and that which is made available is often incomplete or significantly out of date by the time it is published or released.

There is therefore an ongoing need to improve the ability of systems to determine energy infrastructure information by processing a multitude of information sources. The objective is not only to increase the quantity of information that may be provided to subscribers of feature recognition system, but also to improve its quality, level of detail, accuracy and timeliness.

In light of the need for efficient water management in the energy industry, tools to facilitate a dynamic online EI feature recognition system configured to provide information useful for water sourcing, recycling and disposal may be employed in which buyers and sellers of water source or disposal capacity may exchange information related to either an availability of—or a requirement for—water, including a number of relevant attributes such as its quantity, location, type, and quality. Such a system may address not only the water resource needs associated with energy infrastructure development, including, for example oilfield exploration and development, but also the need and supply of other associated energy resources, services, or infrastructure.

While such systems assist with the energy industry related water marketplace in general, there remains a need to ultimately transport energy industry related water between locations and to determine how this may be optimized. Vehicular transportation of fluids is one possibility (for example, via fluid container trucks) while the use of a temporary or permanent pipeline is another. The selection of which method to use will often be made based on an estimate of the financial costs associated with each method. Such costs are, in turn, a function of numerous other factors associated with i) the fluid itself (for example, the volume and type of fluid to be transported), ii) the terrain between the start and destination locations (for example, the distance over which it must travel, the elevation profile, the type of terrain and features or obstacles within it, the use and ownership of the land, the ease of access and so on), and iii) other non-terrain-related factors such as truck or pipeline capacity, and the cost of fuel, labor, or materials.

The difference in cost between a well-optimized fluid transportation solution and one that is poorly optimized may be highly significant, hence it is important to carefully plan the solution and to account for the multitude of factors that contribute to its eventual cost and performance. To do so requires accurate and timely information about the movement of fluids.

The disclosure herein provides a technical solution to these problems and describes systems and methods in which non-anonymized and anonymized location data pertaining to mobile devices moving within EI or oilfield regions is processed by a location data tracking processing system and used by a feature recognition system to determine new EI or oilfield information. The disclosure further provides rules and algorithms selected to operate in conjunction with EI information and anonymized data to provide new information about existing EI features and/or EI workers. The anonymized location data is processed by the location tracking data processing system in conjunction with non-anonymized location data when present and existing EI or oilfield information (such as may be previously stored by the system) to determine the new EI or oilfield information. In some examples, the systems and methods include the determination of job information of a mobile device user or asset associated with an anonymous user identifier (ID).

Mobile device users and assets may be associated with one or more job classifications. Job information may describe details about a job classification. For example, job information might be typical hours worked, typical shift length, typical number of shifts per week, whether the job is performed individually or as part of a crew, and so on. Job information related to a job classification might include typical usage time, length of typical journey, frequency of trip, average maintenance time, and so on.

For the purposes of reading the description of the various embodiments below, the following descriptions of the sections of the specifications and their respective contents may be helpful:

Section A describes a network environment and computing environment which may be useful for practicing embodiments described herein.

Section B describes embodiments of systems and methods in which anonymized and non-anonymized location data pertaining to mobile devices moving within EI regions is processed by a feature recognition system and used to determine new EI information.

A. Computing and Network Environment

Prior to discussing specific embodiments of the present solution, it may be helpful to describe aspects of the operating environment as well as associated system components (e.g., hardware elements) in connection with the computer implemented methods and systems described herein. Referring to FIG. 1A, an embodiment of a network environment is depicted. In a brief overview, the network environment may include one or more clients 102a-102n (also generally referred to as local machines(s) 102, client(s) 102, client node(s) 102, client machine(s) 102, client computer(s) 102, client device(s) 102, endpoint(s) 102, or endpoint node(s) 102) in communication with one or more servers 106a-106n (also generally referred to as server(s) 106, node(s) 106, machine(s) 106, or remote machine(s) 106), one or more online platforms 180a-180n (also generally referred to as online platforms(s) 180, online platform 180), one or more information source 150a-150n (also generally referred to as information source(s) 150, record node(s) 150, record machine(s) 150, or remote record machine(s) 150), one or more anonymized location data source(s) 182a-182n, one or more non-anonymized location data source(s) 184a-184n, and one or more aerial image sources 101a-101n via one or more networks 104. In some embodiments, one or more of client 102, online platform 180, anonymized location data source 182, non-anonymized location data source 184, or information source 150 has the capacity to function as both a node seeking access to resources provided by a server and as a server providing access to hosted resources for other clients 102a-102n, online platforms 180a-180n, and information sources 150a-150n. Examples of client(s) 102 includes platform user(s) 190 and subscriber(s) 195.

Although FIG. 1A shows network 104 between clients 102, online platform 180, information source 150, aerial image source 101 and servers 106, in examples clients 102, online platforms 180, anonymized location data source 182, non-anonymized location data source 184, information source 150, aerial image source 101 and servers 106 may be on the same network 104. In some embodiments, there are multiple networks 104 between clients 102, online platforms 180, anonymized location data source 182, non-anonymized location data source 184, information source 150, aerial image source 101 and servers 106. In embodiments, network 104' (not shown) may be a private network and network 104 may be a public network. In other embodiments, network 104 may be a private network and network 104' may be a public network. In still other embodiments, networks 104 and 104' may both be private networks. Servers 106 may be used to generically refer to all of online platform 180, anonymized location data source 182, non-anonymized location data source 184, information source 150 aerial image source 101 and servers 106. Clients 102, online platform 180, information source 150, anonymized location data source 182, and non-anonymized location data source 184 may process input from server 106 and/or may provide access as needed to various applications, modules, and other software components of server 106 to other various applications, modules, and other software components of server 106.

Network 104 may be connected via wired or wireless links. Wired links may include Digital Subscriber Line (DSL), coaxial cable lines, or optical fiber lines. Wireless links may include Bluetooth®, Bluetooth Low Energy (BLE), ANT/ANT+, ZigBee, Z-Wave, Thread, Wi-Fi®, Worldwide Interoperability for Microwave Access (WiMAX®), mobile WiMAX®, WiMAX®-Advanced, NFC, SigFox, LoRa, Random Phase Multiple Access (RPMA), Weightless-N/P/W, an infrared channel or a satellite band. The wireless links may also include any cellular network standards to communicate among mobile devices, including standards that qualify as 2G, 3G, 4G, or 5G. The network standards may qualify as one or more generations of mobile telecommunication standards by fulfilling a specification or standards such as the specifications maintained by the International Telecommunication Union. The 3G standards, for example, may correspond to the International Mobile Telecommuniations-2000 (IMT-2000) specification, and the 4G standards may correspond to the International Mobile Telecommunication Advanced (IMT-Advanced) specification. Examples of cellular network standards include AMPS, GSM, GPRS, UMTS, CDMA2000, CDMA-1×RTT, CDMA-EVDO, LTE, LTE-Advanced, LTE-M1, and Narrowband IoT (NB-IoT). Wireless standards may use various channel access methods, e.g., FDMA, TDMA, CDMA, or SDMA. In some embodiments, different types of data may be transmitted via different links and standards. In other embodiments, the same types of data may be transmitted via different links and standards.

Network 104 may be any type and/or form of network. The geographical scope of the network may vary widely and network 104 can be a body area network (BAN), a personal area network (PAN), a local-area network (LAN), e.g., Intranet, a metropolitan area network (MAN), a wide area network (WAN), or the Internet. The topology of network 104 may be of any form and may include, e.g., any of the following: point-to-point, bus, star, ring, mesh, or tree. Network 104 may be an overlay network which is virtual and sits on top of one or more layers of other networks 104'. Network 104 may be of any such network topology as known to those ordinarily skilled in the art capable of supporting the operations described herein. Network 104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv4 and IPv4), or the link layer. Network 104 may be a type of broadcast network, a telecommunications network, a data communication network, or a computer network.

In some embodiments, the system may include multiple, logically-grouped servers 106. In embodiments, a logical group of servers may be referred to as a server farm or a machine farm. In other embodiments, servers 106 may be geographically dispersed. In other embodiments, a machine farm may be administered as a single entity. In other embodiments, the machine farm includes a plurality of machine farms. Servers 106 within each machine farm can be heterogeneous—one or more of servers 106 or machines 106 can operate according to one type of operating system platform (e.g., Windows, manufactured by Microsoft Corp. of Redmond, Washington), while one or more other servers 106 can operate according to another type of operating system platform (e.g., Unix, Linux, or Mac OSX).

In one embodiment, servers 106 in the machine farm may be stored in high-density rack systems, along with associated storage systems, and located in an enterprise data center. In this embodiment, consolidating servers 106 in this way may improve system manageability, data security, the physical security of the system, and system performance by locating servers 106 and high-performance storage systems on localized high-performance networks. Centralizing servers 106 and storage systems and coupling them with advanced system management tools allows more efficient use of server resources.

Servers 106 of each machine farm do not need to be physically proximate to another server 106 in the same machine farm. Thus, group of servers 106 logically grouped as a machine farm may be interconnected using a wide-area network (WAN) connection or a metropolitan-area network (MAN) connection. For example, a machine farm may include servers 106 physically located in different continents or different regions of a continent, country, state, city, campus, or room. Data transmission speeds between servers 106 in the machine farm can be increased if servers 106 are connected using a local-area network (LAN) connection or some form of direct connection. Additionally, a heterogeneous machine farm may include one or more servers 106 operating according to a type of operating system, while one or more other servers execute one or more types of hypervisors rather than operating systems. In these embodiments, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alto, California; the Xen hypervisor, an open source product whose development is overseen by Citrix Systems, Inc. of Fort Lauderdale, Florida; the HYPER-V hypervisors provided by Microsoft, or others. Hosted hypervisors may run within an operating system on a second software level. Examples of hosted hypervisors may include VMWare Workstation and VirtualBox, manufactured by Oracle Corporation of Redwood City, California.

Management of the machine farm may be de-centralized. For example, one or more servers 106 may comprise components, subsystems and modules to support one or more management services for the machine farm. In embodiments, one or more servers 106 provide functionality for management of dynamic data, including techniques for handling failover, data replication, and increasing the robustness of the machine farm. Each server 106 may communicate with a persistent store and, in some embodiments, with a dynamic store.

Server 106, online platform 180, aerial image source 101 anonymized location data source 182, non-anonymized location data source 184, and information source 150 may be a file server, application server, web server, proxy server, appliance, network appliance, gateway, gateway server, virtualization server, deployment server, SSL VPN server, or firewall. In one embodiment, server 106 may be referred to as a remote machine or a node. In an embodiment, a plurality of nodes may be in the path between any two communicating servers. In one embodiment, servers 106, online platforms 180, aerial image sources 101 anonymized location data source 182, non-anonymized location data sources 184, and information sources 150 may be in the path between any two communicating servers 106, online platforms 180, aerial image source 101 or information sources 150.

Figure 1B:
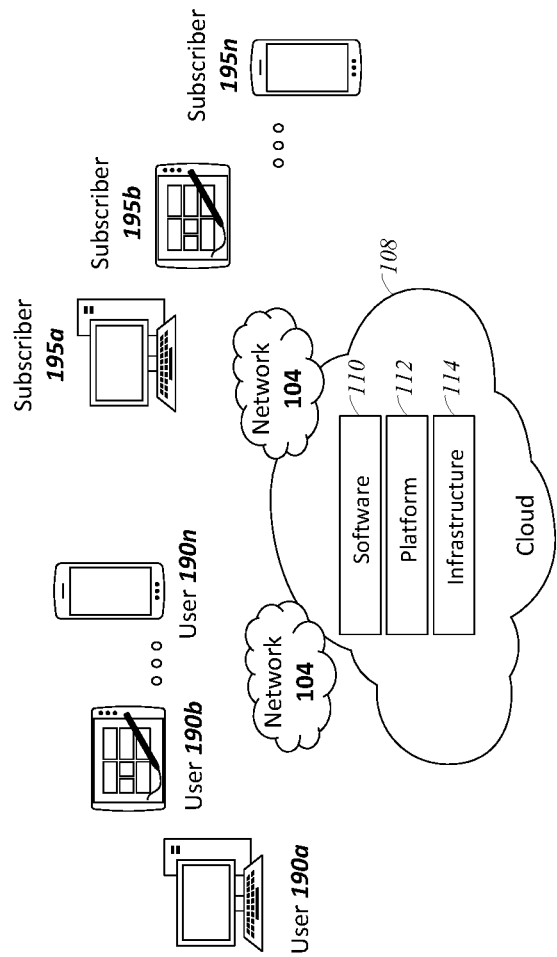
FIG. 1B is a block diagram depicting a cloud computing environment comprising client devices, for example user device and subscriber device, in communication with cloud service providers, according to some embodiments.

Referring to FIG. 1B, a cloud computing environment is depicted. A cloud computing environment may provide platform user 190 and subscriber 195 with one or more resources provided by a network environment. The cloud computing environment may include one or more platform users 190a-190n and one or more subscribers 195a-195n in communication with cloud 108 over one or more networks 104. Platform users 190 and subscribers 195 may include, e.g., thick clients, thin clients, and zero clients. A thick client may provide at least some functionality even when disconnected from cloud 108 or servers 106. A thin client or zero client may depend on the connection to cloud 108 or server 106 to provide functionality. A zero client may depend on cloud 108 or other networks 104 or servers 106 to retrieve operating system data for platform user 190 or subscriber 195. Cloud 108 may include back end platforms, e.g., servers 106, storage, server farms or data centers.

Cloud 108 may be public, private, or hybrid. Public clouds may include public servers 106 that are maintained by third parties to client(s) 102, for example platform user(s) 190 and subscriber(s) 195 or owners of client(s) 102, platform user(s) 190, and/or subscriber(s) 195. Servers 106 may be located off-site in remote geographical locations as disclosed above or otherwise. Public clouds may be connected to servers 106 over a public network. Private clouds may include private servers 106 that are physically maintained by client(s) 102, for example platform user(s) 190 and/or subscriber(s) 195 or owners of client(s) 102, platform user(s) 190, and/or subscriber(s) 195. Private clouds may be connected to servers 106 over private network 104. Hybrid clouds may include both private and public networks 104 and servers 106.

Cloud 108 may also include a cloud-based delivery, e.g., Software as a Service (SaaS) 110, Platform as a Service (PaaS) 112, and Infrastructure as a Service (IaaS) 114. IaaS may refer to a user renting the user of infrastructure resources that are needed during a specified time period. IaaS provides may offer storage, networking, servers or virtualization resources from large pools, allowing the users to quickly scale up by accessing more resources as needed. Examples of IaaS include Amazon Web Services (AWS) provided by Amazon, Inc. of Seattle, Washington, Rackspace Cloud provided by Rackspace Inc. of San Antonio, Texas, Google Compute Engine provided by Google Inc. of Mountain View, California, or RightScale provided by RightScale, Inc. of Santa Barbara, California. PaaS providers may offer functionality provided by IaaS, including, e.g., storage, networking, servers or virtualization, as well as additional resources, e.g., the operating system, middleware, or runtime resources. Examples of PaaS include Windows Azure provided by Microsoft Corporation of Redmond, Washington, Google App Engine provided by Google Inc., and Heroku provided by Heroku, Inc. of San Francisco California. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include Google Apps provided by Google Inc., Salesforce provided by Salesforce.com Inc. of San Francisco, California, or Office365 provided by Microsoft Corporation. Examples of SaaS may also include storage providers, e.g., Dropbox provided by Dropbox Inc. of San Francisco, California, Microsoft OneDrive provided by Microsoft Corporation, Google Drive provided by Google Inc., or Apple iCloud provided by Apple Inc. of Cupertino, California.

Client(s) 102, for example platform user(s) 190 and/or subscriber(s) 195 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP and may use Representational State Transfer (REST) protocol or Simple Object Access Protocol (SOAP). Client(s) 102, for example platform user(s) 190 and/or subscriber(s) 195 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Client(s) 102, for example platform user(s) 190 and/or subscriber(s) 195 may access SaaS resources through the use of web-based user interfaces, provided by a web browser (e.g., Google Chrome, Microsoft Internet Explorer, or Mozilla Firefox provided by Mozilla Foundation of Mountain View, California). Client(s) 102, for example platform user(s) 190 and/or subscriber(s) 195 may also access SaaS resources through smartphone or tablet applications, including e.g., Salesforce Sales Cloud, or Google Drive App. Client(s) 102, for example platform user(s) 190 and/or subscriber(s) 195 may also access SaaS resources through the client operating system, including e.g., Windows file system for Dropbox.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Client(s) 102, for example platform user(s) 190 and/or subscriber(s) 195 and server 106 may be deployed as and/or executed on any type and form of computing device, e.g., a computer, network device or appliance capable of communicating on any type and form of network and performing the operations described herein.

Figure 1C:
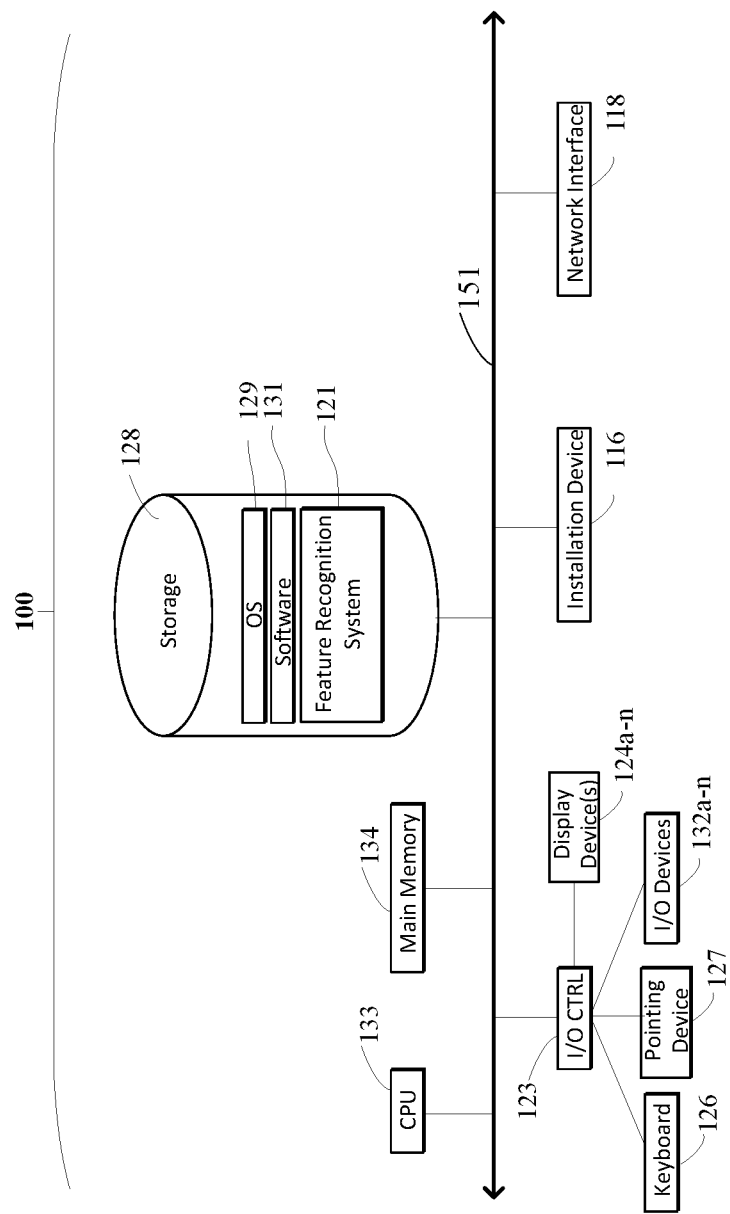
FIGS. 1C and 1D are block diagrams depicting embodiments of computing devices useful in connection with the methods and systems described herein.
Figure 1D:
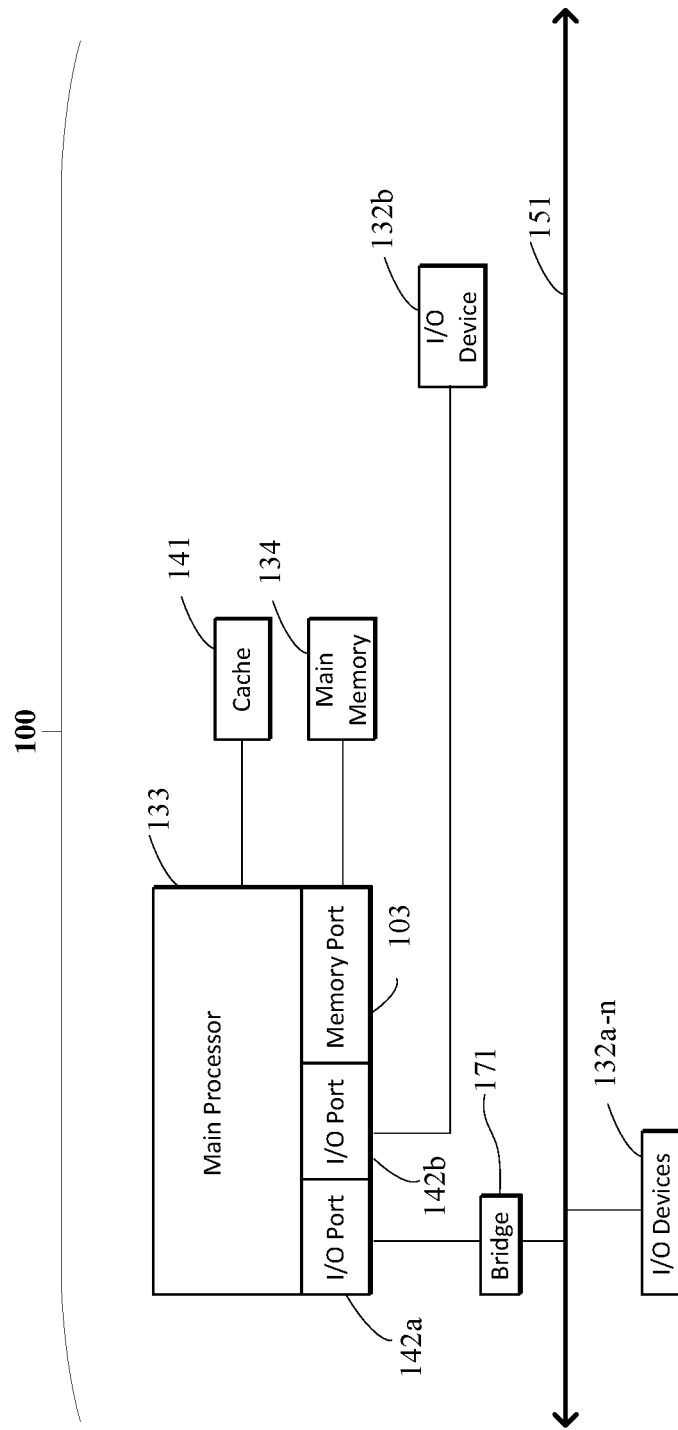

FIGS. 1C and 1D depict block diagrams of computing device 100 useful for practicing an embodiment of the client 102, online platform 180, information source 150, aerial image source 101 and server 106. As shown in FIGS. 1C and 1D, each computing device 100 includes central processing unit (CPU) 133, and main memory unit 134. As shown in FIG. 1C, computing device 100 may include storage device 128, an installation device 116, network interface 118, an I/O controller 123, display devices 124a-124n, keyboard 126 and pointing device 127, e.g., a mouse. Storage device 128 may include, without limitation, an operating system 129, software 131, software of feature recognition system 121. As shown in FIG. 1D, each computing device 100 may also include additional optional elements, e.g., memory port 103, input/output port 142, bridge 171, one or more input/output devices 132a-132n (generally referred to using reference numeral 132), and cache memory 141 in communication with central processing unit 133.

Central processing unit 133 is any logic circuitry that responds to and processes instructions fetched from main memory unit 134. In many embodiments, central processing unit 133 is provided by a microprocessor unit, e.g.: those manufactured by Intel Corporation of Mountain View, California; those manufactured by Motorola Corporation of Schaumburg, Illinois; the ARM processor and TEGRA system on a chip (SoC) manufactured by Nvidia of Santa Clara, California; the POWER4 processor, those manufactured by International Business Machines of White Plains, New York; or those manufactured by Advanced Micro Devices of Sunnyvale, California. Computing device 100 may be based on any of these processors, or any other processor capable of operating as described herein. Central processing unit 133 may utilize instruction level parallelism, thread level parallelism, different levels of cache, and multicore processors. A multi-core processor may include two or more processing units on a single computing component. Examples of multi-core processors include the AMD PHENOM IIX2, INTER CORE i5 and INTEL CORE i4.

Main memory unit 134 may include one or more memory chips capable of storing data and allowing any storage location to be directly accessed by the microprocessor (CPU) 133. Main memory unit 134 may be volatile and faster than storage 128 memory. Main memory units 134 may be Dynamic Random-Access Memory (DRAM) or any variants, including static Random-Access Memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, main memory 134 or storage 128 may be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. Main memory 134 may be based on any of the above described memory chips, or any other available memory chips capable of operating as described herein. In the embodiment shown in FIG. 1C, processor 133 communicates with main memory 134 via system bus 151 (described in more detail below). FIG. 1D depicts an embodiment of computing device 100 in which the processor communicates directly with main memory 134 via memory port 103. For example, in FIG. 1D the main memory 134 may be DRDRAM.

FIG. 1D depicts an embodiment in which main processor 133 communicates directly with cache memory 141 via a secondary bus, sometimes referred to as a backside bus. In other embodiments, main processor 133 communicates with cache memory 141 using system bus 151. Cache memory 141 typically has a faster response time than main memory 134 and is typically provided by SRAM, B SRAM, or EDRAM. In the embodiment shown in FIG. 1D, processor 133 communicates with various I/O devices 132 via local system bus 151. Various buses may be used to connect central processing unit 133 to any of I/O devices 132, including a PCI bus, a PCI-X bus, or a PCI-Express bus, or a NuBus. For embodiments in which the I/O device is a video display 124, processor 133 may use an Advanced Graphic Port (AGP) to communicate with display 124 or I/O controller 123 for display 124. FIG. 1D depicts an embodiment of computer/computing device 100 in which main processor 133 communicates directly with I/O device 132b or other processors 133' via HYPERTRANSPORT, RAPIDIO, or INFINIBAND communications technology. FIG.

1D also depicts an embodiment in which local busses and direct communication are mixed: processor 133 communicates with I/O device 132*a* using a local interconnect bus while communicating with I/O device 132*b* directly.

A wide variety of I/O devices 132*a*-132*n* may be present in computing device 100. Input devices may include keyboards, mice, trackpads, trackballs, touchpads, touch mice, multi-touch touchpads and touch mice, microphones, multi-array microphones, drawing tablets, cameras, single-lens reflex cameras (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Devices 132*a*-132*n* may include a combination of multiple input or output (I/O) devices, including, e.g., Microsoft KINECT, Nintendo Wiimote for the WII, Nintendo WII U GAMEPAD, or Apple iPhone. Some I/O devices 132*a*-132*n* allow gesture recognition inputs through combining some of the inputs and outputs. Some I/O devices 132*a*-132*n* provide for facial recognition which may be utilized as an input for different purposes including authentication and other commands. Some I/O devices 132*a*-132*n* provide for voice recognition and inputs, including, e.g., Microsoft KINECT, SIRI for iPhone by Apple, Google Now or Google Voice Search, and Alexa by Amazon.

Additional I/O devices 132*a*-132*n* have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or on a wall, and may also interact with other electronic devices. Some I/O devices 132*a*-132*n*, display devices 124*a*-124*n* or group of devices may be augmented reality devices. The I/O devices may be controlled by I/O controller 123 as shown in FIG. 1C. The I/O controller may control one or more I/O devices, such as, e.g., keyboard 126 and pointing device 127, e.g., a mouse or optical pen. Furthermore, an I/O device may also provide storage and/or installation device 116 for computing device 100. In still other embodiments, computing device 100 may provide USB connections (not shown) to receive handheld USB storage devices. In further embodiments, I/O device 132 may be a bridge between system bus 151 and an external communication bus, e.g., a USB bus, a SCSI bus, a FireWire bus, an Ethernet bus, a Gigabit Ethernet bus, a Fiber Channel bus, or a Thunderbolt bus.

In some embodiments, display devices 124*a*-124*n* may be connected to I/O controller 123. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g., stereoscopy, polarization filters, active shutters, or auto stereoscopy. Display devices 124*a*-124*n* may also be a head-mounted display (HMD). In some embodiments, display devices 124*a*-124*n* or the corresponding I/O controllers 123 may be controlled through or have hardware support for OPENGL or DIRECTX API or other graphics libraries.

In some embodiments, computing device 100 may include or connect to multiple display devices 124*a*-124*n*, which each may be of the same or different type and/or form. As such, any of I/O devices 132*a*-132*n* and/or I/O controller 123 may include any type and/or form of suitable hardware, software, or combination of hardware and software to support, enable or provide for the connection and use of multiple display devices 124*a*-124*n* by computing device 100. For example, computing device 100 may include any type and/or form of video adapter, video card, driver, and/or library to interface, communicate, connect or otherwise use display devices 124*a*-124*n*. In one embodiment, a video adapter may include multiple connectors to interface to multiple display devices 124*a*-124*n*. In other embodiments, computing device 100 may include multiple video adapters, with each video adapter connected to one or more of display devices 124*a*-124*n*. In some embodiments, any portion of the operating system of computing device 100 may be configured for using multiple displays 124*a*-124*n*. In other embodiments, one or more of display devices 124*a*-124*n* may be provided by one or more other computing devices 100*a* or 100*b* connected to computing device 100, via network 104. In some embodiments, software may be designed and constructed to use another computer's display device as second display device 124*a* for computing device 100. For example, in one embodiment, an Apple iPad may connect to computing device 100 and use the display of device 100 as an additional display screen that may be used as an extended desktop. One ordinarily skilled in the art will recognize and appreciate the various ways and embodiments that computing device 100 may be configured to have multiple display devices 124*a*-124*n*.

Referring again to FIG. 1C, computing device 100 may comprise storage device 128 (e.g., one or more hard disk drives or redundant arrays of independent disks) for storing an operating system or other related software, and for storing application software programs such as any program related to feature recognition system 121. Examples of storage device 128 include, e.g., hard disk drive (HDD); optical drive including CD drive, DVD drive, or BLU-RAY drive; solid-state drive (SSD); USB flash drive; or any other device suitable for storing data. Some storage devices 128 may include multiple volatile and non-volatile memories, including, e.g., solid state hybrid drives that combine hard disks with solid state cache. Some storage devices 128 may be non-volatile, mutable, or read-only. Some storage devices 128 may be internal and connect to computing device 100 via bus 151. Some storage devices 128 may be external and connect to computing device 100 via an I/O device 132 that provides an external bus. Some storage devices 128 may connect to computing device 100 via network interface 118 over network 104, including, e.g., the Remote Disk for MACBOOK AIR by Apple. Some client devices 100 may not require non-volatile storage device 128 and may be thin clients or zero clients 102. Some storage devices 128 may also be used as installation device 116 and may be suitable for installing software and programs. Additionally, the operating system and the software can be run from a bootable medium, for example, a bootable CD, e.g., KNOPPIX, a bootable CD for GNU/Linux that is available as a GNU/Linux distribution from knoppix.net.

Client device 100 may also install software or application from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform may facilitate installation of software on client device 102. An application distribution platform may include a repository of applications on server 106 or cloud 108, which clients 102a-102n may access over network 104. An application distribution platform may include applications developed and provided by various developers. A user of client device 102 may select, purchase and/or download an application via the application distribution platform.

Furthermore, computing device 100 may include network interface 118 to interface to network 104 through a variety of connections including, but not limited to, standard telephone lines LAN or WAN links (e.g., 802.11, T1, T3, Gigabit Ethernet, InfiniBand), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMAX and direct asynchronous connections). In one embodiment, computing device 100 communicates with other computing devices 100' via any type and/or form of gateway or tunneling protocol e.g., Secure Socket Layer (SSL) or Transport Layer Security (TLS), or the Citrix Gateway Protocol manufactured by Citrix Systems, Inc. Network interface 118 may comprise a built-in network adapter, network interface card, PCMCIA network card, EXPRESSCARD network card, card bus network adapter, wireless network adapter, USB network adapter, modem or any other device suitable for interfacing computing device 100 to any type of network capable of communication and performing the operations described herein.

Computing device 100 of the sort depicted in FIGS. 1C and 1D may operate under the control of an operating system, which controls scheduling of tasks and access to system resources. Computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2000, WINDOWS Server 2012, WINDOWS CE, WINDOWS Phone, WINDOWS XP, WINDOWS VISTA, and WINDOWS 4, WINDOWS RT, WINDOWS 8 and WINDOW 10, all of which are manufactured by Microsoft Corporation of Redmond, Washington; MAC OS and iOS, manufactured by Apple, Inc.; and Linux, a freely-available operating system, e.g., Linux Mint distribution ("distro") or Ubuntu, distributed by Canonical Ltd. of London, United Kingdom; or Unix or other Unix-like derivative operating systems; and Android, designed by Google Inc., among others. Some operating systems, including, e.g., the CHROME OS by Google Inc., may be used on zero clients or thin clients, including, e.g., CHROMEBOOKS.

Computing device 100 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. Computing device 100 has sufficient processor power and memory capacity to perform the operations described herein. In some embodiments, computing device 100 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, computing device 100 is a gaming system. For example, computing device 100 may comprise a PLAYSTATION 3, or PERSONAL PLAYSTATION PORTABLE (PSP), or a PLAYSTATION VITA device manufactured by the Sony Corporation of Tokyo, Japan, or a NINTENDO DS, NINTENDO 3DS, NINTENDO WII, or a NINTENDO WII U device manufactured by Nintendo Co., Ltd., of Kyoto, Japan, or an XBOX 360 device manufactured by Microsoft Corporation.

In some embodiments, computing device 100 is a digital audio player such as the Apple IPOD, IPOD Touch, and IPOD NANO lines of devices, manufactured by Apple Computer of Cupertino, California. Some digital audio players may have other functionality, including, e.g., a gaming system or any functionality made available by an application from a digital application distribution platform. For example, the IPOD Touch may access the Apple App Store. In some embodiments, computing device 100 is a portable media player or digital audio player supporting file formats including, but not limited to, MP3, WAV, M9A/AAC, WMA Protected AAC, AIFF, Audible audiobook, Apple Lossless audio file formats and .mov, .m4v, and .mp4 MPEG-4 (H.244/MPEG-4 AVC) video file formats.

In some embodiments, computing device 100 is a tablet e.g., the IPAD line of devices by Apple; GALAXY TAB family of devices by Samsung; or KINDLE FIRE, by Amazon.com, Inc. of Seattle, Washington. In other embodiments, computing device 100 is an eBook reader, e.g., the KINDLE family of devices by Amazon.com, or NOOK family of devices by Barnes & Noble, Inc. of New York City, New York.

In some embodiments, client 102 includes a combination of devices, e.g., a smartphone combined with a digital audio player or portable media player. For example, one embodiment is a smartphone, e.g., the iPhone family of smartphones manufactured by Apple, Inc.; a Samsung GALAXY family of smartphones manufactured by Samsung, Inc; or a Motorola DROID family of smartphones. In yet another embodiment, client 102 is a laptop or desktop computer equipped with a web browser and a microphone and speaker system, e.g., a telephony headset. In these embodiments, client(s) 102 are web-enabled and can receive and initiate phone calls. In some embodiments, a laptop or desktop computer is also equipped with a webcam or other video capture device that enables video chat and video call.

In some embodiments, the status of one or more machines 101, 102, 106, 180, 184, 182, and 150 in network 104 is monitored, generally as part of network management. In embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In other embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. Location Based Intelligence for EI

The following describes systems and methods regarding the use of anonymized and non-anonymized location data pertaining to mobile devices and other assets and the use of the location data in conjunction with additional information (for example, EI feature or facility information) to determine new information about the EI feature or facility about the job function of the user IDs of the mobile devices in and around the EI feature or facility. The terms "location data" and "location tracking data" may be used interchangeably.

The term EI "feature" or simply "EI" is used extensively in this disclosure to refer to a constituent component of energy infrastructure (EI). For example, in the context of the oil and gas industry, an EI feature may be a well pad or a drilling rig at an existing or potential drilling or hydraulic fracturing oilfield, whereas in the context of the solar industry, an EI feature may be a solar panel, or a solar panel array at a solar power station. An EI "facility" or EI "site", such as an existing or potential drilling or hydraulic fracturing oilfield site, or a solar or wind-power station, may comprise a concentration or a plurality of EI features within a given locale, for example, each serving a purpose or function to enable operations at that facility or site. An EI feature is associated with a geographical location at which it is located and may further be associated with one or more EI feature types and/or EI feature status attributes.

EI features of numerous types are discussed within this disclosure. EI facilities and features may apply equally to other resources. For example, EI facilities include downstream or midstream oil and gas facilities, such as refineries, and EI features in such facilities include product oil, gas, or refined product storage tanks. Mines may also be considered EI facilities, and EI features associated with a mine EI facility may include for example tailing ponds, milling facilities, mineral processing facilities, hazardous waste storage facilities, and so on. EI facilities may also include forestry sites where logging or reforestation takes place. In general, the principles of the disclosure apply broadly for analysis of logistics of fluid and bulk commodities.

In the context of the oil and gas industry, for which exemplary examples are provided, EI feature types may include for example, a well pad, a frac-water pit, a rig, a tank battery and so forth. In the context of the solar energy industry, EI feature types may include for example, a solar panel array, a power conditioning substation, or a security fence. Further examples of EI feature types may be found in Table 1. EI feature status attributes may be indicative of a status of a particular aspect of an EI feature at the associated geographical location. Numerous EI feature status attributes are also discussed within this disclosure, and may include for example, an area or size, a fluid level or volume, a number of sub-parts, an ownership and so forth. Other examples of EI feature status attributes not disclosed here are contemplated herein.

In the context of this disclosure, an "EI feature" may be identified as the result (i.e., using the output of) of an image processing operation, a location tracking data processing system operation, or a feature recognition system operation. The identification of the EI feature may further classify the identified EI feature as being of a particular EI feature type or having a particular EI feature status. The term EI "facility" may be used to refer to one or more EI features in a particular location or site. Aspects of this disclosure also relate to image processing, location tracking data processing, or a feature recognition processing using Artificial Intelligence (AI).

Figure 2A:
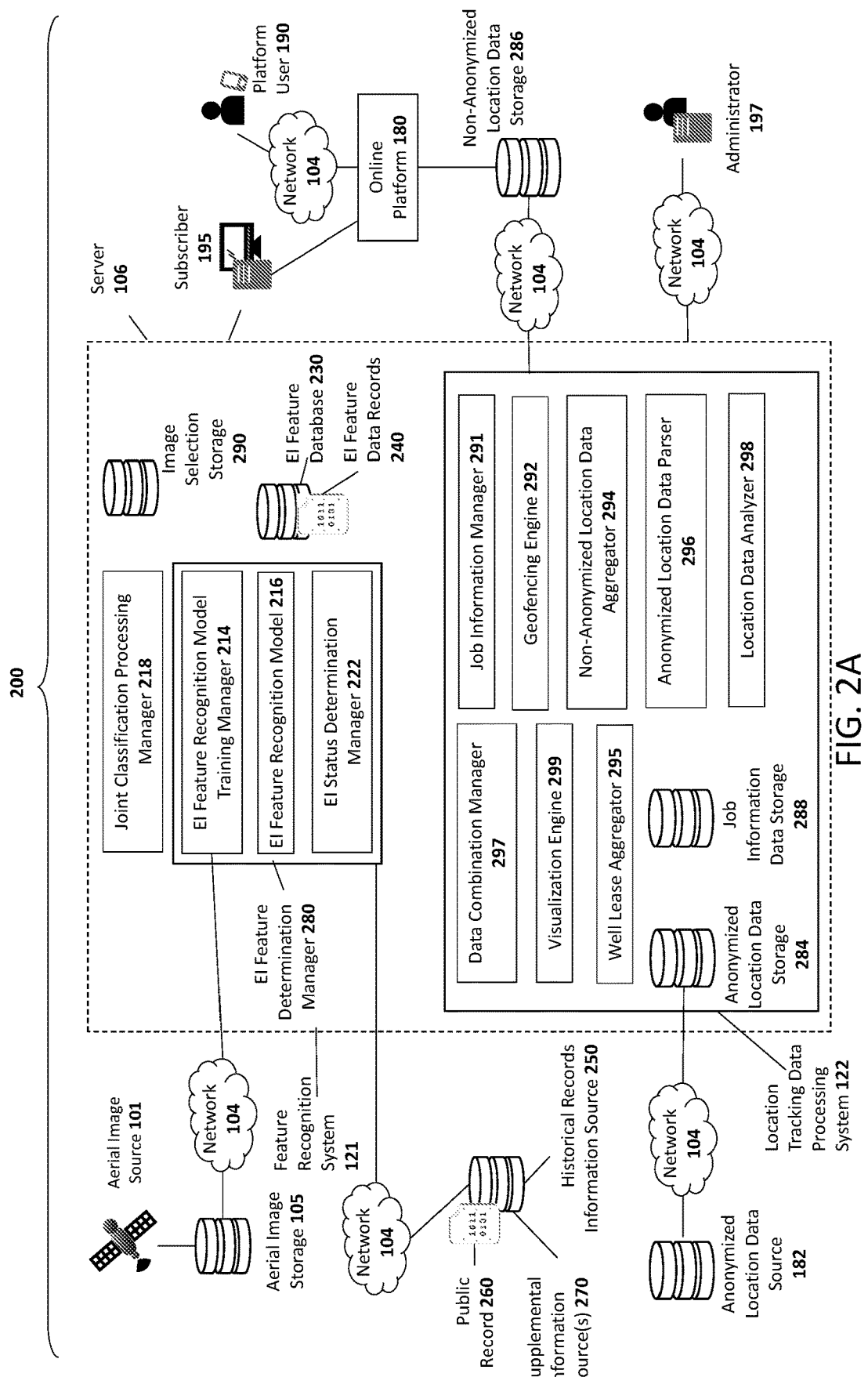
FIG. 2A shows a system configured for processing data associated with Energy Infrastructure (EI) features and user location data, according to some embodiments.

In a general overview, FIG. 2A shows system 200 for determining job classification of anonymous user ID and for determining EI feature information, identification, and status. System 200 includes feature recognition system 121. In an embodiment, feature recognition system 121 may be configured to use image processing to automatically scan aerial images from aerial image storage 105, optionally captured by aerial image source 101 to identify EI features, EI site activities, or EI feature status. In an embodiment, feature recognition system 121 may be configured for presenting the information thereby obtained to platform users 190 and subscribers 195. Aerial image source 101 may be a satellite or any other suitable overhead imaging device, such as images captured by drone, helicopter, or airplane.

System 200 includes anonymized location data source 182. Many mobile devices, such as smartphones, tablet computers and laptops are capable of tracking and reporting their location via one or more location-based technologies, such as satellite location technologies such as GPS, or terrestrial location technologies such as may be deployed within cellular networks. The device location may be measured by the device and reported via a wireless network or may be measured or otherwise determined by the wireless network itself. The device location may also be determined by one or more sensors, for example ground level sensors or sensors mounted on fixed equipment or infrastructure, or sensors mounted on movable equipment or infrastructure. In some examples, a device location may be determined (e.g. from radio frequency signals) using triangulation methods, Time Difference of Arrival (TDOA), Angle of Arrival (AoA) or other techniques employing one or multiple sensors that may communicate with each other or with a common server.

In general, device location tracking information may be obtained from any mobile device or piece of equipment or vehicle that is location enabled. Various software applications that are installed on the device or in the equipment or vehicle may rely on device location information to provide particular services or intended functionality to the user of the device/equipment/vehicle. In some cases, device location information may be collected by the operating system of the mobile device or of an on-board computer on a piece of equipment or a vehicle. In situations, device location information obtained from any mobile device or piece of equipment or vehicle that is location enabled may be reported to cloud-based applications within the network for a wide variety of purposes such as to help retrieve a lost or stolen device, to locate and/or track a piece of equipment or a vehicle, to enable location-based advertising or alerting, to assist with travel and navigation, fitness monitoring and so forth. In some examples, location information obtained from mobile devices, equipment or vehicles may be anonymized and stored in anonymized location data source 182, and this anonymized location information may be used for example to provide insights that are commercially valuable. Individuals, companies, or research groups may subscribe to anonymized location data source 182 to gain access to anonymized location data.

System 200 includes non-anonymized location data storage 286. Non-anonymized location data storage 286 may store location data associated with non-anonymized user IDs. In some examples, non-anonymized location data may be provided to location tracking data processing system 122 by non-anonymized location data aggregator 294.

Non-anonymized location data aggregator 294 is an aggregation location engine configured to aggregate non-anonymized location data such as location information associated with known EI features or sites and devices of users or assets with known job classifications. Non-anonymized location data aggregator 294 may access and process location information associated with EI features or sites that have previously been identified by the system 200 and devices of users or assets with job classifications previously identified by the system 200. Non-anonymized location data aggregator 294 may be provided as a part of an EI navigation application or platform such as online platform 180 or any other navigation and tracking application used to collect and/or aggregate non-anonymized location data.

In some examples, location information may be used or generated by software applications or clients of online platform 180 that are installed on the mobile devices 102 of platform user 190. Platform user 190 may have agreed to have their identity associated with their location information. Platform user 190 associated location information may be collected by online platform 180 associated with the software application or client installed on mobile device 102 and may be stored in non-anonymized location data storage 286. In some examples, non-anonymized location data aggregator 294 may operate as part of, or in conjunction with, online platform 180, and may have a client application that is installed in devices or equipment capable of collecting location data, such as mobile devices, vehicle trackers, machine trackers or object trackers. Non-anonymized location data aggregator 294 may obtain necessary permissions or consent from corresponding owners or users of devices capable of location tracking (such as platform user 190) before collecting location related information in association with the user of the device. In some examples, platform user 190 may be an employee of a company wherein the company requires employees to download and install a client-side application associated with online platform 180 as a condition of employment.

Subscriber 195, which may for example be an individual or a company, may subscribe to feature recognition system 121 to receive analytics or insights, or may subscribe to online platform 180 to receive non-anonymized location data collected by online platform 180 or analytics generated by online platform 180. Online platform 180 may have access to EI feature database 230 comprising EI feature data records 240 providing details of EI features including relevant details such as their locations and names or identifiers. Information within EI feature database 230 may be used in conjunction with platform user 190's current location to provide platform user 190 navigation services within a region.

Information associated with EI features may be collated and processed by feature recognition system 121. The purpose of feature recognition system 121 may be to provide insights, for example to subscribers 195, into oilfield status and activity, which in turn may be used to drive commercial decisions, to optimize processes and gain efficiencies, to facilitate the trading of products and services, or to identify business opportunities. Examples of insights that may be provided by feature recognition system 121 include but are not limited to the identification of new or emerging EI sites or EI features (such as drilling sites or oilfield infrastructure), the development status of emerging EI sites or EI features such as which components of the site have been completed and which are still to be developed, the operational status at an EI site (for the oilfield site example, such status might include whether drilling has commenced or ceased, the arrival of materials or human resources, the need for products or services at the oilfield site, or activity levels at the oilfield site such as whether an activity is starting, ongoing, or terminating, and/or the rate at which an activity is progressing In general, feature recognition system 121 may maintain a database of data records for known EI features and for each EI feature data record, may store additional information relating to its status. Known EI features may include previously identified EI features. The types of status information stored may be specific to a particular EI feature type. For example, a frac pond may have status information that includes a volume capacity and a current fill level, whereas a pipeline may have status attributes that include a length and a current flow rate (e.g. as may be measured by a flow rate sensor).

EI feature database 230 may maintain EI feature data records 240 which record EI feature activities. For example, for an EI feature that is an oil well, activities may include drilling, oil production, water production, water injection, well completion, and so on. For each activity, EI feature data records 240 may hold additional information about the activity, such as the start and stop time of the activity, the rate of the activity, the resources in use to achieve the activity, and so on.

Joint classification processing manager 218 of feature recognition system 121 may collect and process EI feature and status information across a number of inter-related EI features (such as those co-located or located nearby, for example those that may be within the same geofence or the same EI site) to provide a composite indication of status at a particular location or site. In examples, EI feature determination manager 280 may identify a well pad, a drilling rig, and an increasing fill level of a frac pond. Joint classification processing manager 218 may use this information together with the locations of the well pad, drilling rig, and frac pond to provide a composite indication that drilling at the location is imminent.

By processing multiple supplemental information sources, such as from supplemental information source(s) 270, EI feature determination manager 280 and/or location tracking data processing system 122, feature recognition system 121 may be capable of identifying EI features or EI feature information that is not apparent when considering each information source in isolation. For example, two separate information sources may suggest (each with a low confidence level) that a particular EI feature may be present at a given location. However, by combining the two information sources, feature recognition system 121 may be capable of identifying or classifying the EI feature at a much higher confidence level.

Feature recognition system 121 may be cloud based and comprise software running either centrally, or in distributed fashion, across one or more servers. Feature recognition system 121 may be accessible by client devices of its subscribers 195 (which may be paid subscribers or unpaid subscribers) via any suitable wired or wireless network.

Aerial images captured by aerial image source 101 may be stored in aerial image storage 105. Such aerial images may be provided to feature recognition system 121, through either a direct connection or via network 104. Server 106 may be controlled, configured or administered by administrator 197, who may be connected to server 106 directly or via network 104.

Referring to FIG. 2A in more detail, in some embodiments, EI feature determination manager 280 may be configured to process aerial images, such as those stored in image selection storage 290, to determine information on EI features. In doing so, EI feature determination manager 280 may include EI feature recognition model 216 and use artificial intelligence (AI) in determining EI features information or status.

In some examples, EI feature recognition model 216 may communicate with EI feature recognition model training manager 214 to combine artificial intelligence and image processing with information from supplemental information source(s) 270 and/or location tracking data processing system 122, to train EI feature recognition model 216 to identify for example i) the presence (or change thereof) of an EI feature, and its classification or type or ii) one or more status attributes (or change thereof) associated with an EI feature. EI feature recognition model training manager 214 may be configured to interact with joint classification processing manager 218, EI status determination manager 222, image selection storage 290, or EI feature database 230 to train artificial intelligence EI feature recognition model 16 based on, for example, a neural network or other type of machine learning. Identified EI 'feature-level' information may be stored in EI feature data records in EI feature database 230. EI feature-level information may include, for example, information about a presence, type, or status of an identified EI feature (e.g., an oilfield frac-water pit or drilling rig, see Table 1 for further examples). In some examples, EI feature recognition model 216 may be trained to recognize one or more of the following EI features. The examples provided in Table 1 are non-exhaustive.

TABLE 1

| Examples of EI features or sites | |
| --- | --- |
| Frac-water pits (also known as frac ponds or frac water impoundments) | These are typically man-made surface ponds or reservoirs used to store fresh or brackish water prior to its injection into an oilfield well, or flowback or produced water that may be returned from the oilfield well. |
| Well pads | Surface sites comprised of a leveled, usually-rectangular area used to seat machinery and equipment for oilfield drilling, completing, producing and maintaining oil and gas wells. |
| Drilling rigs | Machines and associated structures that perform the oilfield drilling. |
| Pipeline infrastructure | Fixed or temporary pipes to transport oil, gas, or water. |
| Service roads | Roads, typically unpaved, that enable transport of equipment and resources to and from Energy Infrastructure sites or features, for example, in an oilfield context, to well pads or other oilfield facilities. |
| Clearings | Surface sites comprised of a levelled, often-rectangular area where the purpose of the site is not yet known. |
| Trucks | Vehicles used to transport resources, equipment and waste products to and from EI sites or service locations. These may be used, for example, for sand, chemical, cement, water or oil transport. |
| Tank batteries | A group of storage tanks connected to an oil or gas well or saltwater-disposal well to receive oil or water produced by an oilfield well. |
| Proppant stores | Proppant is a solid material, usually sand, that is injected into an oilfield well to help keep a newly created fracture open. An example of a proppant store would be a sand pile amassed at an oilfield well pad prior to commencement of drilling. |
| Drilling reserve pits | Small reservoirs of water used for oilfield drilling muds and drill cuttings that are accumulated during oil and gas drilling operations. |
| Frac spreads | Large temporary gatherings of tanks, pressure pumps, trucks, pipes and other equipment and workers to fracture or "complete" a drilled oilfield well and thereby commence oil and or gas production from the oilfield well. |
| Sand mines | An area where sand is extracted from the ground for use as proppant. |
| Producing wells | Drilled and completed oil and or gas wells that are now producing hydrocarbons. |
| Flare systems | Infrastructure to facilitate the burning of gas or oil at an oilfield site, for example during well production testing, for safety or emergency purposes or to manage waste production. Flare systems may comprise for example ground flares, |
| Solar panel mounts | Fixed or sun-tracking solar panel mounting frames, or associated foundations, piles, ballasts, earth screws or baseplates for the affixation of solar panels. |
| Solar panels | Power generation infrastructure comprising a panel surface, or array of panel surfaces for the collection of radiant light energy and its conversion to other forms, such as electricity. |

TABLE 1-continued

Examples of EI features or sites

| | |
|---|---|
| Electrical Substations | An installation or building comprising equipment for the conditioning or adaptation of electrical power signals, voltages or waveforms, for interconnection between power generation infrastructure and electrical power grids, or for power storage, metering, protection or isolation. |
| Security fences | A fence to protect and secure energy infrastructure sites or energy infrastructure features. |
| Buildings | Buildings or offices to house components of energy infrastructure, communications, monitoring or other equipment, resources, supplies, vehicles, workers or staff |
| Cable systems | Cable, mounts, pylons, trenches and associated infrastructure for overhead, ground-level or subterranean transport of electrical energy. |
| Wind Energy Collectors | Power generation infrastructure associated with the collection of energy from wind and its conversion to other forms such as electricity, including tower structures, turbines, nacelles and rotors. |
| Meteorological Monitoring Equipment | Infrastructure and sensors to enabling the monitoring of meteorological conditions and processing of the associated data, comprising for example anemometers, thermometers, barometers, rain gauges, masts and data loggers. |
| Construction Equipment | Machinery or vehicles used to make clearings or to construct buildings or infrastructure, comprising for example, forestry equipment, cranes, earth movers, excavators, borers, forklifts and trucks. |
| Hydroelectric reservoirs or forebays | A body of water used to drive hydroelectric turbines and generators. |
| Hydroelectric intake structures | Structures to filter debris and direct water from a hydroelectric forebay towards the turbine via a hydroelectric water conduit, channel or pipe ("penstock"). |
| Penstocks | Pipes to carry water between reservoirs, forebays, or intake structures to a hydraulic turbine. |
| Surge Chambers | A tank used to control pressure in a penstock. Infrastructure to |
| Hydroelectric Power Houses | house hydroelectric (hydraulic) turbines or generators. |
| Hydroelectric Tailraces | Areas used for the outflow return of water following its use by a hydroelectric turbine. |
| Geothermal Facilities | Structures and equipment for generating geothermal energy. |
| Carbon Capture Facilities | Structures and equipment for carbon capture. |
| Carbon Compressor Equipment | Equipment for carbon dioxide compression prior to sequestration. |

Each EI feature type or classification may be associated with a suitable set of attributes. The values of some of the attributes for a given feature may be derived through image processing, joint classification processing, and/or location tracking data processing. Some examples of EI feature types and their attributes and example sources of information are shown in Table 2.

TABLE 2

Examples of EI feature status attributes

| Feature Classification | Attribute | Example source of data |
|---|---|---|
| Frac-water pit | Detection date/time | Image analysis, public records, |
| | Location | land ownership records, image |
| | Area or size | analysis, sensor networks, location |
| | Surface rights owner | data with job classification |
| | Mineral rights owner | |
| | Fluid level or volume | |
| | Fluid or material type | |
| | Fluid or material color | Image analysis, sensor |
| | | networks, public records, location |
| | Fluid or material quality | data with job classification |
| | Material or fluid attribute | |
| | Connectivity | |

TABLE 2-continued

Examples of EI feature status attributes

| Feature Classification | Attribute | Example source of data |
|---|---|---|
| Well pad | Detection date/time<br>Location<br>Area or size<br>Surface rights owner<br>Mineral rights owner | Image analysis, public records, land ownership records, location data with job classification |
| Drilling Rig | Detection date/time<br>Location<br>Size<br>Surface rights owner<br>Mineral rights owner<br>Level of activity, inactivity, operation, status (idle, active) | Image analysis, public records, land ownership records, sensor networks, location data with job classification |
| Pipeline infrastructure | Detection date/time<br>Location<br>Length, width or size<br>Fluid type<br>Surface rights owner<br>Mineral rights owner<br>Bore size<br>Flow rate<br>Connectivity | Image analysis, public records, land ownership records, sensor networks, location data with job classification |
| Service road | Detection date/time<br>Location<br>Length, width or size<br>Surface type<br>Surface rights owner<br>Mineral rights owner | Image analysis, public records, land ownership records, location data with job classification |
| Clearing | Detection date/time<br>Location<br>Length, width or area<br>Surface rights owner<br>Mineral rights owner | Image analysis, land ownership records, location data with job classification |
| Trucks | Detection date/time<br>Location<br>Number<br>Type<br>Level of activity, inactivity, operation, status (idle, active)<br>Surface rights owner<br>Mineral rights owner | Image analysis, roadside video cameras, land ownership records, location data with job classification |
| Tank Battery | Detection date/time<br>Location<br>Location Number of tanks<br>Size of tanks<br>Fluid level or volume<br>Surface rights owner<br>Mineral rights owner | Image analysis, public records, sensor networks, land ownership records, location data with job classification |
| Proppant store | Detection date/time<br>Location<br>Size, volume or weight<br>Proppant type<br>Surface rights owner<br>Mineral rights owner | Image analysis, public records, land ownership records, location data with job classification |

EI feature recognition model 216 may be an application, service, daemon, routine, or other executable logic for applying artificial intelligence and/or machine learning to analyze data inputs to provide EI feature-level information. In some examples, system 200 may include EI feature recognition model training manager 214, for example comprised within EI feature determination manager 280. EI feature recognition model training manager 214 may communicate with EI feature recognition model 216 and may have access to EI feature data records 240 which may be stored in EI feature database 230. EI feature recognition model training manager 214 may have access to supplemental information source(s) 270. In embodiments, EI feature recognition model training manager 214 may have access to public record 260 which may be stored in historical records information source(s) 250. EI feature recognition model training manager 214 may communicate with EI status determination manager 222 and may share information with online platform 180 via network 104.

In embodiments, EI feature recognition model training manager 214 may be configured to train EI feature recognition model 216. Artificial intelligence models may be of a variety of types, for example linear regression models, logistic regression models, linear discriminant analysis models, decision tree models, naïve bayes models, K-nearest neighbors models, learning vector quantization models, support vector machines, bagging and random forest models, and deep neural networks. In general, all AI models aim to learn a function which provides the most precise correlation between input values (X) and output values (Y):

$$Y=f(X)$$

In general, EI feature recognition model training manager 214 trains EI feature recognition model 216 using historic sets of inputs (X) and outputs (Y) that are known to be correlated. For example, in a linear regression AI model represented by the expression:

$$Y = B_0 \times B_1 X$$

A set of 'n' historical data points $(X_i, Y_i)$ are used to estimate the values for $B_0$ and $B_1$, for example:

$$B_1 = \frac{\sum_{i=1}^{n}\left((X_i - \bar{X}_i) \times (Y_i - \bar{Y}_i)\right)}{\sum_{i=1}^{n}(X_i - \bar{X}_i)^2}$$

$$B_0 = \bar{Y}_i - B_1(\bar{X}_i)$$

Parameters $B_0$ and $B_1$, may be considered coefficients of the AI model. The model with these initial coefficients is then used to predict the output of the model for $Y_{i,M}$, given the set of historic inputs $X_i$. Thus, $Y_{i,M}$, corresponds to a derived output of the model given $X_i$, and may differ to a known (or "correct") output for input $X_i$. The error of these predictions may be calculated using Root Mean Square Error (RMSE), for example:

$$RMSE = \sqrt{\sum_{i=1}^{n} \frac{(Y_{i,M} - Y_i)^2}{n}}$$

EI feature recognition model training manager 214 may then adjust the coefficients $B_0$ and $B_1$ to minimize the RMSE over multiple historical data sets $(X_i, Y_i)$. Different types of AI models use different techniques to adjust the weights (or values) of various coefficients, in general by using historical data sets that are correlated in the way that the model is trying to predict in new data sets by minimizing the predicted error of the model when applied to the historical data sets.

In some examples, system 200 may include joint classification processing manager 218. Joint classification processing manager 218 may be configured to process information on both a first and a second EI feature together with information on a relationship between the first and second EI features, to identify or improve an identification of the first EI feature.

In some examples, joint classification processing manager 218 may be configured to communicate with EI feature recognition model 216 and/or with EI feature database 230. In some examples, joint classification processing manager 218 may be configured to communicate EI feature-level information obtained as a result of its operation to EI feature database 230 for subsequent storage. Joint classification processing manager 218 may be an application, service, daemon, routine, or other executable logic for identifying EI features.

System 200 may comprise supplemental information source(s) 270 including supplemental information. Supplemental information may include public records 260, such as may, for example, be recorded by a government agency or other authoritative body. Supplemental information may also include historical records, which may for example be stored within historical records information source(s) 250. Examples of supplemental information that may be obtained from supplemental information source(s) 270 and which may be used by system 200 include drilling permits or permit filings, spud reports, and completion reports for oil and gas wells, water wells and disposal wells. System 200 may be configured such that supplemental information source(s) 270 may communicate with, connect to, or be accessed by other components of server 106, for example, feature recognition system 121.

In a further optional aspect, system 200 may comprise EI status determination manager 222, which may be configured to determine a composite indication of EI site status. For example, EI status determination manager 222 may combine information, such as the determination of the presence of a clearing, a service road, and a frac-water pit all within a radius of 500 meters of a particular geographical location within an oilfield region, to generate a composite indication of EI site status that an oilfield exploration site is under development at that location. EI status determination manager 222 may be an application, service, daemon, routine, or other executable logic for determining a composite indication of EI site status based on information related to a plurality of EI features.

Further details involving the joint classification processing manager 218 and EI feature determination manager 280 may be found in U.S. Pat. Nos. 10,726,263, 10,460,169, 10,719,708, and 10,460,170, each of which is incorporated herein.

In examples of system 200, configuration and maintenance of server 106 may be controlled by administrator 197 who may access or control server 106 either directly or via network 104. System 200 may be configured such that operations that may be performed by administrator 197 may include for example, the updating of software or firmware used by any component of the server, the configuring, receiving or processing of diagnostic reports or logs, the configuring of parameters, variables, or thresholds used by any component of the server, the reading or writing of data from any storage within server 106, or the performing of a direct communication or a communication via network 104 with system components external to server 106.

System 200 includes location tracking data processing system 122. Location tracking data processing system 122 may include job information manager 291, geofencing engine 292, non-anonymized location data aggregator 294, well lease aggregator 295, anonymized location data parser 296, data combination manager 297, location data analyzer 298, and visualization engine 299.

Location tracking data processing system 122 may be configured to process known EI feature information, for example associated with a known EI site, and anonymized location data (that is, location data associated with an anonymized user ID) to determine, assign, or associate a job classification to an anonymous user ID. Location tracking data processing system 122 may be configured to process anonymized location data associated with an anonymous user ID for which a job classification has been assigned to identify a new or previously unknown EI feature or EI feature site. Location tracking data processing system 122 may be configured to process location data associated with an anonymized user ID for which a job classification has been assigned together with information related to one or more known EI features to determine a status or characteristic of the one or more EI features. For example a waste water production rate of a well can be estimated by tracking the number of anonymous user IDs associated with the job classification "fluid transportation truck driver" that move between a producing well and a disposal site, or the frequency with which anonymous user IDs associated with the job classification "fluid transportation truck driver" visit a producing well. In other examples, the frequency with which anonymous user IDs associated with the job classification "fluid transportation truck driver" visit a disposal well may indicate the capacity of the disposal well. Using the insights obtained by system 200 new business opportunities may be identified. In some examples, the estimated activity levels may be represented on a continuous scale or may be compared against one or more thresholds to classify oilfield sites as "active" or "dormant," or one of a range of quantized values. In an implementation, location tracking data processing system 122 may also be configured to compare EI feature activity levels and fluid or resource production levels from different periods or points in time to detect a change in activity levels at an EI feature site. For example, location tracking data processing system 122 may detect a sudden drop in the number of journeys being made by oil truck drivers to or from a producing well and may therefore obtain new EI information indicating that the producing well has been closed or that production has temporarily decreased or ceased. In an implementation, location tracking data processing system 122 may further estimate or determine the volume of production (for example, on a daily, monthly or annual basis) that the detected change in activity level may lead to.

In one example, the EI feature information may include a location of the EI feature or an identification of the type of EI feature. Feature recognition system 121 may establish associations between the information in EI feature data records 240 stored in EI feature database 230 and anonymized location data by identifying and processing information common to (or correlated to) the EI feature and the anonymized location data. The anonymized location data may include a time series of location coordinates associated with the movement of one or a group of anonymous user IDs that have been recorded and stored. In some examples, anonymized user IDs are persistent, that is the same anonymized user ID is associated with a user over a period of time without changing. Where anonymized user IDs are persistent, anonymized location data spanning any region of time may be used, and anonymized location data associated with a persistent anonymized user ID may have been captured at any time in the past. In contrast, where anonymized user IDs are persistent for a limited period of time, for example a day or a week or a month, then only location data analyzed over the persistence period is useful in deriving a job function of a user, and a derived job function for such a non-persistent anonymized user ID must be discarded at the end of the persistence period. Thus, useful anonymized location data may be historical in nature (taken some weeks, months or even years ago), or it may be more recent (e.g. it may correspond to near-real-time location tracking information, or location tracking information recorded during the persistence period of the anonymized user ID).

Anonymized location data parser 296 is configured to process the anonymized location data by parsing location data of one, more than one, or each anonymous user ID of a group of anonymous user IDs. With location data parsed for an anonymous user ID, a job classification for the anonymous user ID may be determined based on the location data of that anonymous user ID. In some examples, anonymized location data may be processed in batches or groups without parsing the location data of individual anonymous user IDs. In some examples, a job classification for a group of anonymous user IDs may be determined together based on location data of the group of anonymous user IDs following a similar pattern or having similar characteristics. For example, a group of anonymous user IDs with the job classification "fluid transportation truck driver" may be created and the location data of the "fluid transportation truck driver" group analyzed together by location tracking data processing system 122.

Data combination manager 297 is configured to combine data and information identified by the location tracking data processing system 122. For example, the data combination manager 297 may be configured to associate location data of one or more anonymous user IDs that have not been assigned a job classification with visited locations associated with the one or more anonymous user IDs that have been assigned a job classification. In other examples, the data combination manager 297 may operate in conjunction with other managers discussed herein, as described in greater detail below.

Geofencing engine 292 is configured to establish a perimeter, e.g., a geofence, around an EI feature or site. Such a geofence in some examples may be used as the boundary of determination that a user has visited the EI feature or site. In examples, geofencing information for an EI feature may be stored in an EI feature data record 240 for the EI feature in EI feature database 230.

Location data analyzer 298 is configured to process the location data of an anonymous user ID. Location tracking data processing system 122 may obtain anonymized location data from anonymized location data storage 284, and non-anonymized location data from non-anonymized location data storage 286. Location tracking data processing system 122 may communicate the anonymized location data and the non-anonymized location data to location data analyzer 298.

Location data analyzer 298 is configured to determine that the device associated with the anonymous user ID traverses the geofence around an EI feature or site, the device associated with the anonymous user ID would be considered to have visited the EI feature or site. In some embodiments, geofencing engine 292 tracks the dwell time (the amount of time that a device associated with an anonymous user ID is within a geofence) associated with an EI feature or site. Geofencing engine 292 is configured to determine an appropriate geofence dwell time for determining that a user visited a particular type of EI feature or site by considering anonymized and non-anonymized location data associated with user IDs of known job classifications. For example, geofencing engine 292 may consider the dwell times of devices of user IDs of job classification "fluid transportation truck driver" inside a set geofence of a type of EI feature or site and based on the dwell times of those devices inside the geofence may determine, for example using an artificial intelligence model, what an appropriate dwell time, range of dwell times, minimum or maximum dwell times or dwell time thresholds should be applied for that type of EI feature or site in the determination of the job classification of an anonymous user ID associated with location data that visits that type of EI feature or site. In some examples, dwell times associated with job classifications may be stored as part of an EI feature data records 240 in EI feature database 230.

Geofencing engine 292 is configured to apply a series of algorithms and/or rules to identify a location of and determine an ideal size or size range of a geofence for a specific EI feature or site type. A size or size range for a geofence for a specific EI feature, facility, or site may be selected to minimize false positives and false negatives. For example, an overly large geofence may capture the presence of user IDs that are actually engaging with a different location. This represents a false positive. In an example, an overly large geofence may capture a parking lot of a neighboring feature or a nearby road. An overly small geofence may fail to capture the presence of user IDs that are engaging with the geofenced area. For example, an overly small geofence may fail to capture the entire grounds or parking area of a facility, and thus fail to capture the presence of a user ID that is present at the EI feature. In another example, aspects of the EI feature may be located some distance from a central aspect of the EI feature. For example, a tank battery may be located a large distance away from an associated well. Selecting a geofence that is too small may fail to include both the tank battery and the well.

In other examples, geofencing engine 292 may determine for a given EI feature or site type that a geofence smaller than a specific size is often crossed only by user IDS that are employees of the EI feature or site, rather than user IDs who are coming and going from the EI feature or site. Geofencing engine 292 may determine that a geofence is too large if the geofence envelopes or overlaps the geofence of a different EI feature or site.

The geofencing engine 292 may operate by applying a predetermined set of rules to specific EI features or sites. Geofencing engine rules may include perimeter estimations based on a known footprint of an EI feature. Each EI feature type may have a rule that defines the boundaries of the geofence perimeter based on the known footprint. Such rules may define a geofence perimeter to a be a certain amount larger (e.g., relatively by percentage or absolutely by measured distance) than a known footprint of the EI feature. Alternatively a footprint of an EI feature may be determined through analysis of public records (e.g., regulatory records, maps, GIS data, etc.) and/or through satellite imaging and machine learning techniques employed to identify EI features.

The geofencing engine 292 may further determine, according to geofencing engine rules, to adjust or modify an initial geofence determination. The geofencing engine 292 may first select an initial geofence based on the EI feature type and then further modify the geofence based on specific information about the specific EI feature. For example, the perimeter of a geofence may be modified to include a driveway or road leading to the EI feature if the driveway or road leads only to the EI feature and/or if a threshold percentage of the activity on the driveway or road is below an inclusion threshold. In further embodiments, the geofencing engine 292 may modify the geofence according to a location of the specific EI feature. For example, EI features located in urban areas may be more closely situated next to schools, houses, apartments, and offices. In such circumstances, the geofencing engine 292 may rely on address and map data to identify nearby facilities and modify geofences accordingly.

In embodiments, geofencing engine 292 may determine geofencing engine rules according to an artificial intelligence model. Inputs to such an artificial intelligence model may include, for example, location data associated with known job classifications and known EI features, facilities, and sites. By training on such data, geofencing engine 292 may determine appropriate geofences specific to known EI features, sites, and facilities that accurately correlate with the location data of the known job classifications while reducing or eliminating false positives and false negatives. In embodiments, the geofencing engine rules may be selected so as to produce a geofence size for a given EI feature or site type capable of determining with a threshold accuracy the job classification of an anonymized user ID based on the location data of the anonymized user ID.

In embodiments, artificial intelligence geofencing engine rules may take the form of machine learning models. An artificial intelligence engine, when supplied relevant training sets, as described above, may generate a machine learning geofencing model. The machine learning geofencing model may then be applied to new data to determine geofences relevant to new EI features.

The determination or validation of the appropriate geofence size for an EI feature or site or feature or site type by geofencing engine 292 may be based at least in part on the success rate in determining correct job classifications for non-anonymous user IDs for which the actual job is known by assessing the location data of the non-anonymous user IDs that have entered within a geofence of the EI feature or site or feature or site type.

In embodiments, the geofencing engine 292 may determine EI geofences as follows. The presence of an EI feature may be identified via public records, via satellite imagery, user input, anonymous or non-anonymous location data collected from user IDs, and/or by any other means. A point geometry, e.g., a polygon, of the EI feature may be determined. The point geometry of the EI feature may be determined according to a determined footprint of the EI feature. In embodiments, a pre-determined footprint of an EI feature may be selected as existing at the identified location of the EI feature. The pre-determined footprint may be selected, e.g., according to the type of EI feature identified. In embodiments, a specific footprint of the identified EI feature may be determined. The specific footprint may be determined, e.g., by satellite imagery EI feature detection techniques, analysis of maps, roadmaps, and/or GIS data, analysis of public records, etc. Each of these data sources may be applied via a specific ruleset tailored to the data source. The point geometry, i.e., footprint, of the EI feature may then be buffered. Buffering the EI feature may be performed based on an absolute rule, e.g., adding a specific distance to each point in the point geometry to expand the radius. Specific distances may include 10m, 20m, 30m, 40m, 50m, 60m, 70m, 80m, 90m, and/or 100m or more. Specific distances may be selected according to an EI feature type. Buffering the EI feature may be performed according to a relative rule, e.g., adding a specific percentage of relative size the point geometry. For example, the polygon described by the point geometry may be expanded by 5%, 10%, 20%, 25%, or more, as required. Specific percentages may be selected according to specific EI feature types. In further embodiments, buffering of the geofence may be limited according to rulesets that take into account neighboring features. For example, where a map indicates that land plots that neighbor an EI feature are occupied by businesses or residences, a rule may be applied to limit the geofence area to the boundaries of such land plots.

Geofencing engine 292 is further configured to determine dwell time thresholds or ranges, e.g., minimum, and maximum dwell times within a specific geofence, to be associated with specific job classifications for specific EI features, sites, and facilities. For example, dwell times below a certain minimum threshold may indicate that a user ID has simply passed through an EI feature and is thus not associated. Dwell times above a certain minimum threshold but below a different maximum threshold (e.g., within a dwell time range) may indicate one job classification while dwell times in a different dwell time range may indicate a different job classification. For example, a truck driver may visit an EI feature for between 30 minutes and 2 hours on a regular basis, while a worker at that specific EI feature may visit the EI feature for between 6 and 10 hours on a regular basis.

Geofencing engine 292 is configured to create, select, and/or apply the dwell time thresholds and ranges. Dwell time thresholds are each selected to correspond to a combination of EI feature type and job classification. Each job classification may have a specific dwell time related to specific EI features. For example, the job classification of a water truck driver may have multiple specific dwell time thresholds that correspond with various EI features that the water truck driver may be expected to visit—e.g., a trucking depot housing water trucks, water disposal facilities (e.g., SWDs), oil wellsites, etc. Other job classifications may also be expected to visit these sites but may have different dwell time thresholds. For example, dwell time thresholds for employees of a site may be longer while dwell time thresholds of site inspectors may be shorter. The rules and thresholds may be selected to reduce the rates of false positives and false negatives in job classification—e.g., to increase the % accuracy in job classifications. Geofencing engine 292 may be configured to apply artificial intelligence models to determine dwell time thresholds and ranges, for example using known job classifications of user IDs and known information about EI features.

In some examples, a relationship is determined between the dwell time inside a geofence and the size of the geofence. In examples, geofencing engine 292 may use a multivariate optimization to jointly determine the optimal dwell time—geofence size combination for a specific EI feature, for an EI feature type, for a specific EI site, or for a specific EI site type, where the variable to be analyzed is the % of job classification assignments for anonymized user IDs that are found to be correct. Such a multivariable optimization may be performed via machine learning techniques employing known job classifications of user IDs and known information about EI features as inputs.

Job information manager 291 is configured to process visited locations corresponding to an anonymized user ID to identify a job classification with the anonymized user ID. The anonymized user ID may represent a person, individual or physical asset (such as a vehicle) that is associated with (e.g. carries) the mobile device. Job information manager 291 utilizes the dwell time determined by geofencing engine 292 together with geofencing information and anonymized location data in determining the job classification of an anonymous user ID. Job information manager 291 may associate one or more geofence dwell time thresholds, generated by the geofencing engine 292, with an EI feature or site with one or more job classifications that may be associated with that type of EI feature or site. In examples, such associations may be stored as part of an EI feature data records 240. For example, if a device associated with an anonymous user ID has a dwell time within the geofence of a producing well of between 30 minutes and 3 hours, then job information manager 291 may determine that the anonymous user ID should be associated with the job classification "fluid transportation truck driver." In examples, if a device associated with an anonymous user ID has a dwell time within the geofence of a wellsite of more than four hours, then job information manager 291 may determine that the anonymous user ID should be associated with the job classification "producing worker" or "frac crew member".

Job information manager 291 is further configured to track anonymous user IDs over a period of time (and/or review a history of multiple locations of the anonymous user ID) to acquire more information. For example, job classifications may be further based on a frequency or a total number of times that an anonymous user ID visits (i.e., satisfies a dwell time threshold or range criterion) a specific EI feature and/or a specific EI feature type. For example, a single 2 hour visit to a water disposal site may not result Based on other information of the anonymous user ID such as work location (for example, production well), work timings, workdays, and such job related information associated with the job classification "producing worker", job information manager 291 may update a record of the anonymous user ID with job information "producing well worker" under the "producing worker" job classification.

Where the anonymized user ID's job information is persistent over time, the newly gained knowledge of the anonymized user ID's job information may then be combined with further location tracking information and/or existing EI feature information to determine new EI feature information. Job information manager 291 may store such learned information in job information data storage 288. Further, job information manager 291 may use such learned information subsequently in job classification determinations. Job information data storage 288 stores information of all job information and job classifications. Job information manager 291 obtains job information and job classifications from public records 260 and other information sources.

In some examples, location data analyzer 298 may determine an EI feature or site or type of an EI feature or site that was previously unknown by server 106. For example, location data analyzer 298 may utilize location data associated with an anonymous user ID that has been associated with a job classification together with other location data associated with user IDs (anonymized or non-anonymized) of the same job classification to determine that a type of EI feature or site (such as a well site, a disposal station, a midstream processing facility, a sand mine or a tank battery) exists at a given location. The type of EI feature or site identified may be associated with the job classifications of anonymous user IDs that frequent the EI feature or site. In examples, data combination manager 297 may work with location data analyzer 298 and EI feature determination manager 280 to determine that a type of EI feature or site exists at a given location. In examples, data combination manager 297 may determine that an anonymous user ID visited one or more known locations of an EI feature of unknown type, based on location inputs from location data analyzer 298, and may determine a set of potential job classifications for the anonymous user ID based on the history of visits. Location data analyzer 298 may track movements of anonymous user IDs and non-anonymous user IDs within locations associated with EI features or sites including tracking instances of user IDs crossing geofences and user ID dwell times inside geofences associated with the EI features or sites. Location data analyzer 298 may identify that an anonymous user ID visited locations associated with EI features or sites based on location data of the anonymous user ID that records the entry, exit and dwell time of the anonymous user ID in geofences associated with the one or more known EI features or sites.

In examples, geofences are generated and updated by geofencing engine 292 around each known EI feature or site and geofencing engine 292 may store geofence data in a local storage or EI feature database 230. Established geofences may enable location data analyzer 298 to track movements of anonymous user ID and non-anonymous ID in locations associated with EI facility or site as defined by the geofence around the EI facility or site. Job information manager 291 may use information about EI facility or site visits by anonymous user IDs, including the dwell time and frequency of visits by the anonymous user IDs to the geofences of the EI facility or site in the process of associating one or more job classifications to the anonymous user IDs.

In some examples, location data analyzer 298 may analyze location data associated with an anonymized user ID to segment it into one or more journeys (also known as trips). Each journey may, for example, be identified by a starting location of the device associated with the anonymous ID and an ending location of the device associated with the anonymous ID. In examples, journeys may be one-way (i.e. from "A" to "B") or return (from "A" to "B" to "A"). One-way or return journeys may also include one or more intermediate locations that are visited en-route between the starting and ending locations. For example, an intermediate location "C" between "A" and "B" may also be detected and considered when journey is stopped for a period of time. For example, if an anonymous user ID stops for a given period of time at location C on the route between location A and location B, then location C could be, in examples, a new EI feature or a local. In one example, if the location C is off the route between location A and location B, there may be an increased likelihood that location C may be a new EI feature that is not previously known. In another example, if the location C is on the route between location A and location B, there may be a likelihood that location C may be a gas station or a restaurant. In examples, dwell time of the anonymous user ID at location C is considered. For example, if the dwell time at C is a long period, i.e. it surpasses a dwell time threshold, then there may be an increased likelihood of location C being be a new EI feature that is not previously known. In examples, if the dwell time of the anonymous user ID at C is short period, i.e., it does not surpass a dwell time threshold, then there may be an increased likelihood that location C is a restaurant or gas station.

In some examples, some anonymous user IDs may make journeys that are similar but not identical to journeys made by other anonymous user IDs. In examples, some anonymous user IDs may make journeys from a starting location to a destination location using a different route or a route with slight deviations as compared to a route taken from the starting location to the destination location by other anonymous user IDs. In examples, location data analyzer 298 may assign the same job classification to all anonymous user IDs that make journeys from the same starting location to the same destination location regardless of the route taken. In other examples, location data analyzer 298 may assign a job classification to a first group of anonymous user IDs that take very similar or identical routes between the a starting location and destination location and may assign a different job classification to a second group of anonymous user IDs that take a different route or not very similar route between the same starting location and destination location.

In some examples, location data analyzer 298 may determine that a number of location data journeys (for either the same user ID, or across different user IDs) route to a given location, and then return to their starting point. The location at which the location data journey changes direction may be identified by location data analyzer 298 as an unknown EI feature or site.

In some embodiments, location data analyzer 298 may record a total number of trips that are made (or their frequency) between known EI features or sites by anonymous user IDs of a given job classification, for example over a fixed period of time such as a day, a week, a month, and so on. Based on this information, location data analyzer 298 may estimate a volume of a resource transported between the known EI features or sites. For example, location data analyzer 298 may estimate an amount of crude oil that is being transported by truck between a producing well and a tank battery by counting the number of trips made by user IDs with the job classification "crude oil truck driver" and multiplying this by the capacity of a crude oil truck.

Job information manager 291 may be configured to associate a job classification with an anonymous user ID based on a correlation between the visited locations of the anonymous user ID and visited locations of one or more non-anonymous user IDs for which the job classification is known. In making this association, job information manager 291 may also consider dwell time within a geofence, and frequency of visits to the locations.

In some examples, job information manager 291 may include a repository of job information and job classifications (for example, job information data storage 288). Job information associated with a job classification may be aggregated from various sources including industry sources. In some examples, job information for a job classification may comprise one or more characteristics of the individual or physical asset such as a job function, role or purpose, or a commercial entity to which the individual or physical asset is related (such as an employer or owner). In examples, job information for a job classification may pertain to a particular journey or trip that user IDs of the job classification are required to make. In some examples, a job classification is a type of job, e.g., construction worker, oil truck driver, frac crew worker. In examples, job information manager 291 may associated more than one job classification with a user ID. For example, job information manager 291 may be configured to distinguish between cases in which the same user ID (which may be an individual or a physical asset) has made a number of trips that are for different purposes and are associated with different job classifications (e.g. a truck driver may sometimes drive a water truck, for which the job classification is "water truck driver" and may sometime drive an oil truck, for which the job classification is "oil truck driver"). In some examples, a job classification may comprise sub-classifications, for example a user ID may have the job classification "truck driver," and in some instances, the user ID would be operating under the sub-classification of "water truck driver" and in some instances, the same user ID would be operating under the sub-classification of "oil truck driver." Job information manager 291 is explained in detail in the description of FIG. 2B.

Well lease aggregator 295 is configured to aggregate well lease information including an identification of the field or reservoir, a lease number, a lease period, lessor information, permit details number and such lease related information from regulatory sources and historical records information source(s) 250. In embodiments, well lease aggregator 295 may obtain public records 260, such as production reports for a well lease, which detail a total volume of produced hydrocarbons and/or produced wastewater across all the wells associated with the given well lease. Well lease aggregator 295 may utilize analyzed location data from location data analyzer 298 and other combinations of data from data combination manager 297 to determine what portion of the total volumes of produced hydrocarbons and produced waste water should be associated with one or more individual wells that are part of the well lease. For example, well lease aggregator 295 may use information related to the frequency and duration of visits of user IDs with the job classification "fluid transportation truck driver" who under-take a journey from a known well site to a known waste water disposal site to estimate the amount of produced water generated by the well.

A similar analysis can be performed to estimate the amount of produced water received by a water disposal EI facility or feature. In some examples, information related to the journeys made by user IDs with the job classification "fluid transportation truck driver" from a multitude of EI facilities and collectively terminating at a single EI facility may be used to estimate the amount of commodity the receiving EI facility is accepting. For example, information related to journeys of user IDs with the job classification "water disposal truck driver" originating from a plurality of producing well EI facilities and collectively terminating at a single salt water disposal (SWD) EI facility, may be used to estimate the remaining capacity of the SWD EI facility at a given point in time. Similarly, information related to journeys of user IDs with the job classification "crude oil truck driver" originating from a plurality of producing well EI facilities and collectively terminating at a single midstream processing EI facility, may be used to estimate the remaining capacity or potential output of the midstream processing EI facility at a given point in time.

In other examples related to fluid commodities that may be transported by truck or by pipeline, information related to the producing well EI facility may include information related to the amount of wastewater the producing well EI facility produces. Using the methods described herein, location data associated with anonymized and non-anonymized user IDs associated with the job classification "water disposal truck driver" that visit the producing well EI facility and travel to one or more SWD EI facilities may be analyzed to estimate the amount of wastewater that is being taken away from the producing well EI facility by truck. Thereafter, the difference between the known volume of wastewater produced by the producing well EI facility and the estimated volume of that wastewater that is being transported away from the producing well EI facility by truck may be used to estimate the volume of fluid transported via one or more pipelines.

Visualization engine 299 is configured to use information from EI feature determination manager 280 and location tracking data processing system 122 to generate visuals through feature recognition system 121 for subscriber 195 or administrator 197. Visualization engine 299 may display a map indicating identification of EI features or sites, locations and/or geofence boundaries associated with the EI features or sites, connection lines or routes of travel (which may also be referred to as trips or journeys) between EI features or sites, ownership details of EI features or sites, or status or production information related to EI features and sites. For example, if an oilfield environment is considered, visualization engine 299 may show various features of the oilfield environment, such as corporate office, well pads, drilling rigs, frac-ponds, sand or proppant stores associated with a drilled well site, sand mines, saltwater disposal wells (SWD), fluid tank batteries, trucks, service roads, saltwater disposal stations and midstream processing facilities. Characteristics associated with such features, such as ownership, well lease identifier, capacity or productivity may also be displayed by visualization engine 299. Visualization engine 299 may also show trips, paths, journeys, locations visited and such location tracking information for anonymized and non-anonymized user IDs, with or without job classifications. Visualization engine 299 may show the EI features with geofencing or without geofencing. In some embodiments, visualization engine 299 may provide administrator 197 or subscriber 195 the ability, for example via a user interface or API, to select what information is displayed, and whether information is updated in real time (for example showing the movement of anonymous user IDs). In example, visualization engine 299 may provide administrator 197 or subscriber 195 the ability, for example via a user interface or API, to show trips, paths, journeys, or locations visited of anonymized and non-anonymized user IDs with a specific job classification, which administrator 197 or subscriber 195 may specify.

In some examples, system 200 may include online platform 180. Online platform 180 may communicate with server 106, one or more platform users 190 or one or more subscribers 195 via one or more networks 104. In some embodiments, online platform 180 may be an application or a program that is designed to track identified users in the act of performing some functions related to their occupation or job function or job classification. In some examples, online platform 180 may be an employee tracking system wherein the employees (platform users 190) agree to provide their identification information to online platform 180, for example as a condition of their employment. Subscriber 195 of online platform 180 may be a supervisor or employer of platform user 190 and may subscribe to online platform 180 to monitor employees. In some examples, personal identity information of platform user 190 is hidden from subscriber 195. In other examples, personal identity information of platform user 190 is visible to subscriber 195.

In examples, a device of subscriber 195 or administrator 197 may be configured to access feature recognition system 121, for example via an application programming interface (API). Access to online platform 180 or feature recognition system 121 may be controlled, for example access may require a subscription, a username and password, or encryption keys. In some examples, data, information, insights or analysis of online platform 180 or feature recognition system 121 may be accessible on a free, paid or subscription basis, and may be presented in its raw form, a distilled form, or in a manner that is tailored to the specific requirements of or format used by online platform 180 or feature recognition system 121 or in a format requested by subscriber 195 or administrator 197, for example in an appropriately-formatted document or report.

Any of online platform 180, EI feature recognition model training manager 214, EI feature recognition model 216, joint classification processing manager 218, EI feature determination manager 280, EI status determination manager 222, feature recognition system 121, and location tracking data processing system 122 and its components may, for example, be a desktop computer, a laptop computer, a mobile device, a server, or any other suitable computing device. Online platform 180, EI feature recognition model training manager 214, EI feature recognition model 216, joint classification processing manager 218, EI feature determination manager 280, and EI status determination manager 222 may comprise a program, service, task, script, library, application or any type and form of executable instructions or code executable on one or more processors. Any of online platform 180, EI feature recognition model training manager 214, EI feature recognition model 216, joint classification processing manager 218, EI feature determination manager 280, EI status determination manager 222 and location tracking data processing system 122 and its components may be combined into one or more modules, applications, programs, services, tasks, scripts, libraries, applications, or executable code.

In operation, the various components and managers of location tracking data processing system 122 may interact with one another in various ways to generate various outcomes and results.

For example, in operation, location tracking data processing system 122 of feature recognition system 121 may obtain information about EI features and sites from various sources such as feature recognition system 121, regulatory sources, commercial data providers, news reports, information obtained via physical inspection of a site or via word of mouth, public record(s) 260 of land or mineral rights ownership, supplemental information source(s) 270, historical records information source(s) 250, sensor data such as flow sensors and so on. Feature recognition system 121 may determine the type or status of an EI feature or site, for example by processing aerial images such as from a satellite, drone or manned aircraft, which may be used to recognize and analyze locations and types of EI features (for example units of infrastructure) as previously described. In some examples, the aerial image processing may be performed by computing devices semi-automatically or may be completely automated, for example using machine learning methods or artificial intelligence to detect, identify or classify EI objects and their types.

In some examples, data combination manager 297 may associate visited locations of an anonymous user ID provided by location data analyzer 298 with location information of EI features for example as may be contained in EI feature database 230, to determine one or more known EI feature locations visited by the anonymous user ID. Based on the associations, job information manager 291 may determine one or more job classifications of a user or a physical asset associated with the anonymous user ID. For example, location data analyzer 298 may identify that a particular anonymous user ID makes frequent trips between a first location and a second location. Data combination manager 297 may associate the first location and the second location with an active producing well and a saltwater disposal well (SWD) respectively based on location knowledge associated with the EI features, for example in EI feature data records 240. Based on association and information associated with trips undertaken by an anonymous user ID, job information manager 291 may classify the anonymous user ID as a fluid transportation truck driver. In some examples, job information manager 291 may additionally determine that since the trips undertaken by the anonymous user ID classified as a fluid transportation truck driver are made between a known producing well and a known SWD, that the load carried is wastewater. In another example, location data analyzer 298 may identify that a particular anonymous user ID takes bi-weekly trips between a first location known to be an active producing well, and a second location known to be a corporate office. From the trips, job information manager 291 may classify or determine that the anonymous user ID as a supervisory engineer. In some examples, location tracking data processing system 122 may also record or log the number of trips that are made (or their frequency), for example between an active producing well and a SWD, across all anonymous user IDs classified as a fluid transportation truck driver and thereby estimate the amount of resources such as volume of water that is being carried (either per driver, or aggregated across all classified fluid transportation truck drivers with trips that originate from a given producing well). According to aspects of the present disclosure, analysis of number of trips that are made (or their frequency), across all anonymous user IDs classified as a fluid transportation truck drivers with the sub-classification of water truck driver, together with the capacity of water trucks allows for the volumes of waste water produced by a specific producing well (or group of wells feeding into a single tank battery) that is part of a bigger lease to be estimated, even though publicly reported regulatory information is known only per lease (and not per producing well).

While the above example relates to the transportation of water, similar analysis may also be done for the transportation of hydrocarbons. For example, location data analyzer 298 may identify that an anonymous user ID frequently travels between location A and location B. Data combination manager 297 may associate location A with a known producing well and location B with a known oil tank battery or midstream processing facility. Based on the association and frequency of travel detected from location data associated with the anonymous user ID, job information manager 291 may classify the anonymous user ID as a fluid transportation truck driver and that the loads carried are crude oil, and in examples, the job sub-classification of the anonymous user ID for data segments analyzed is oil truck driver.

In further examples, job information manager 291 may use historical anonymized location data to identify job classifications associated with anonymous user IDs. For example, job information manager 291 may use historical anonymized location data to identify frac crew workers based on their presence at a known wellsite at the time of its completion. For example, in the US state of Texas, completion reports (for example W-2) must be filed with the Texas Railroad Commission (RRC) within a prescribed time following well completion. Because of the delays that exist prior to their filing, and the potential additional delays before the completion reports are published, this information may not be publicly available for a considerable period of time. However, when the completion reports do become available (and which may then form part of the existing energy infrastructure information stored by server 106, for example in supplemental information source storage 270), location data analyzer 298 may be configured to retrieve historical anonymized location data from the same time period as the reported well completion and to identify which anonymized user IDs were present at that time in that location, or within a geofence around that location. Based on the identification, job information manager 291 may classify these anonymized user IDs as potential frac crew workers.

In examples, the location tracking data processing system 122 may be configured to compare anonymous user IDs based on frequent association with one other, historically or in the present. To improve the confidence level of job classifications, location data analyzer 298 may be configured to analyze anonymized location data from either the same or other time periods to determine anonymized user IDs that are often correlated to one another in terms of their location, and who are likely to be part of the same frac crew group, or to work for the same company. Data combination manager 297 may then assess whether anonymous user IDs that are associated with the same worker group or employer are congregating (or have been visiting) the same location (or within a geofence of the same location) as one another. In examples, data combination manager 297 may use this information where an inter-related group of workers, for example a group of workers with the same job classification (or substantive portion thereof), to infer new EI information such as which companies are involved at a particular EI feature or site, or to infer a status or activity level at that EI feature or site. In some examples, feature recognition system 121 may further take into account (in addition to the detection of an inter-related group of workers) any other existing EI information that is associated with the EI feature or site, for example, satellite imagery suggestive of a developing new drilling operation.

In examples, feature recognition system 121 may use information associated with the detection of an inter-related group of workers to identify the company providing the services to an EI facility. Location data associated with the user IDs of the inter-related group of workers together with dwell time information at various locations visited by the inter-related group of workers can be used for example to determine where the user IDs begin and end a period of time that may be considered a working shift. This information may then be used to determine, for example, where user IDs associated with the job classification "water disposal truck driver" park their trucks at night. This information may be combined with supplemental information or public records which may reveal the address of where the trucks are parked and what person or company owns the address. This information may be used, for example to determine the company that is providing the water disposal service to the given EI facility.

In another example, known historical data, for example regulatory records that show a name of a company providing service at an EI facility (for example a drilling report) can be associated with historical location data of anonymized user IDs, which may be used to associate the anonymized user IDs with a company or employer. Analyzing location data for the user IDs that have a job classification and a company or employer association may be used to identify a company performing services at a new EI facility for which regulatory records are not yet available. The methods and systems described herein can therefore be used to identify supply chain relationships and market shares between service buyers and service providers.

Figure 2B:
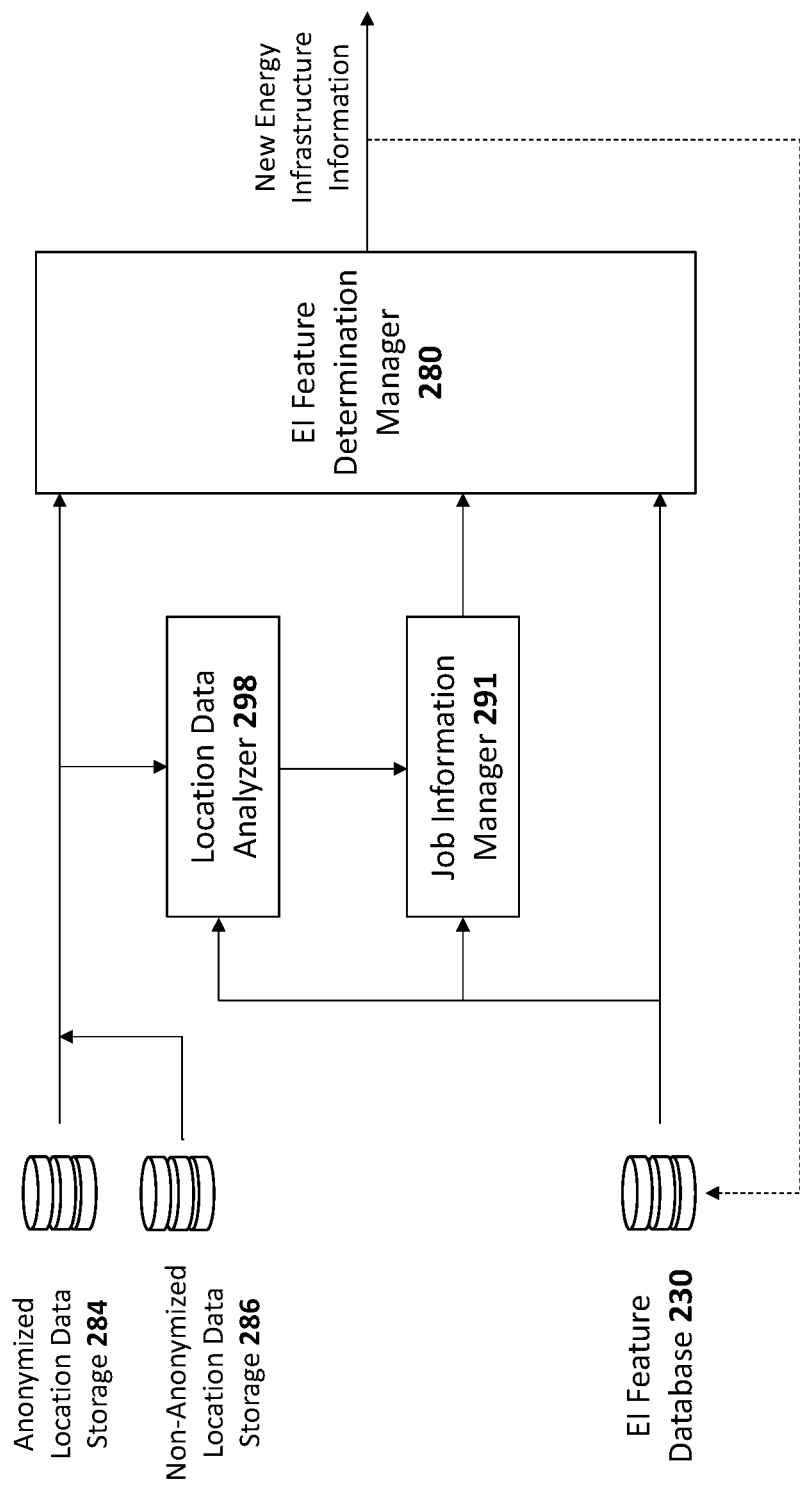
FIG. 2B depicts an implementation of some of an architecture of an implementation of the system to obtain new EI feature information utilizing user location data and user job classification data.

As shown in FIG. 2B, location data analyzer 298 may obtain location data for anonymized user IDs (also referred to as anonymized location data) from anonymized location data storage 284 and location data for non-anonymized user IDs (also referred to as non-anonymized location data) from non-anonymized location data storage 286. In an example, the anonymized location data may include a time series of location coordinates that have been recorded and stored. In some examples, each of the recorded location coordinates within the time series may be time stamped. In general, anonymized location data may span any region of time and may have been captured at any time in the past. Thus, anonymized location data may be historical in nature (for example, taken some weeks, months, or even years ago), or may be more recent (for example, anonymized location data may correspond to near-real-time anonymized location tracking information, or anonymized location tracking information recorded during the last day). In an example, the non-anonymized location data may include user ID or individual or physical asset ID, journeys made by the user ID or individual or physical asset ID, job information of the user ID or object ID, span of time the user ID or object ID being employed in EI, and such information.

Referring again to FIG. 2B, in some embodiments, job information manager 291 may analyze visited locations provided by location data analyzer 298 to determine job classification of an anonymized user ID or physical asset associated with an anonymous user ID. In one example, location data analyzer 298 may identify that a particular anonymous user ID takes bi-weekly trips between a first location known to be an active producing well and a second location known to be a corporate office. From the trips, job information manager 291 may categorize the anonymous user ID as a supervisory engineer. In another example, if location data analyzer 298 identifies that an anonymous user ID frequently travels between a known producing well and a known oil tank battery or midstream processing facility, job information manager 291 may determine that the job classification of the anonymous user ID is a truck driver and that the load carried is crude oil.

Job information manager 291 may determine job classification or information based on visits made by an anonymous user ID that either originate, terminate, or travel via particular known one or more locations of EI. Job information manager 291 may determine job classification or information based on one or more attributes of the EI feature or site at one or more of the visited location(s), such as a type of the feature or site (e.g. producing well, disposal well or sand mine), or an ownership of the feature or site (e.g. an operating company), an ownership of the land on which the feature or site is located, and so forth. A non-exhaustive list of examples is provided in Table 3 below. It shall be appreciated that location tracking data processing system 122 may have existing EI location information only for one end of the journey (with the other end unknown) or may have knowledge for both an originating location and a destination location (e.g. both ends of a journey). Location tracking data processing system 122 may or may not have existing EI information for intermediate visited locations and may or may not also take these into account when determining the job classification or information for the anonymous user ID based on the location data associated with that user ID. It shall further be appreciated that location tracking data processing system 122 may consider a number of other factors in making a job classification or information determination and that this may not be based, for example, on EI feature or site types or commercial ownership data. Additionally, the location data monitoring that is used to determine the job classification or information may have far greater complexity than simplistic examples that are shown here. For example, location tracking data processing system 122 may collect and analyze location data for a large number of journeys (either for the same anonymous user ID or potentially across a large number of different anonymous user IDs) and perform statistical analysis of the location data to better inform job information manager 291 and improve its job classification accuracy.

TABLE 3

| Originating Location | Destination Location | Job Information |
|---|---|---|
| Producing well or water tank battery | Saltwater disposal well or water pipeline | Water transportation truck driver |
| Producing well or crude tank battery | Crude storage facility, midstream processing facility or midstream pipeline terminal | Crude oil transportation truck driver |

TABLE 3-continued

| Originating Location | Destination Location | Job Information |
| --- | --- | --- |
| Drilling reserve pits | Landfill or treatment facility for hazardous oilfield waste | Solid waste transportation truck driver |
| Crude battery | Midstream processing facility | Crude oil transportation truck driver |
| Sand mine | Emerging new well site or drilling location | Truck driver transporting sand to use as proppant for pressurized fracture-inducement |
| Water station or water recycling facility | Emerging new well site or drilling location | Truck driver transporting water to use for pressurized fracture-inducement |
| Corporate office locations | Emerging new well sites, existing producing wells or saltwater disposal wells | Managerial or administrative staff |
| Regulatory office locations | Emerging new well sites, existing producing wells or saltwater disposal wells | Regulatory staff |
| Truck depot owned by company "A" | Sand mine operated by company "B" | Truck driver employed by company "A" and contracted to sand mining company "B" |
| Chemicals/materials storage or warehouse facility owned by company "C" | Emerging new well site or drilling location operated by company "D" | Chemicals or materials supply driver of company "C", supplying to operator "D". |

In some embodiments, job information manager 291 may be configured to leverage non-anonymized location data in analysis of anonymized location data. For example, job information manager 291 may be configured to process non-anonymized location data that includes visited locations associated with the non-anonymous user ID and a known job classification of a non-anonymous user ID to determine a job classification of an anonymous user ID. In examples, the processing may include comparing data of visited locations associated with the non-anonymous user ID with data of visited locations associated with an anonymous user ID. Similarities in data of visited locations associated with the non-anonymous user ID with data of visited locations associated with an anonymous user ID, may indicate a correlation in a job classification of the non-anonymous user ID with the anonymous user ID. Based on the correlation, job information manager 291 may associate a job classification with the anonymous user ID.

In examples, some oilfield workers may make use of an oilfield navigation application or any tracking application on their mobile device, for example as may be provided by online platform 180 and may have consented to the use of the location data that the application reports to the online platform (in examples associated with their non-anonymized user ID).

Location data for anonymous user IDs may also exist in anonymized location data storage 284. In some cases, job information manager 291 may identify a correlation between a time series of recorded location points within anonymized location data storage 284 and a time series of location points within non-anonymized location data storage 286, for example received from online platform 180. In some examples, data combination manager 297 may associate or 'bind' the anonymous user ID in anonymized location data storage 284 with a known platform user 190 of online platform 180. Online platform 180 may hold additional details regarding platform user 190, such as for example, his or her job classification, employer or commercial affiliation. In examples, platform user 190 may have provided this information at the time of installing the application of online platform 180, or at the time of establishing a related platform user account. Therefore, if appropriate platform user consents are in place, these additional details may then be accessed from online platform 180 or non-anonymized location data storage 286 by location tracking data processing system 122 and associated with one or more anonymous user ID(s) within anonymized location data storage 284. In examples, such associations provide information to determine or confirm job classification(s) for the one or more anonymous user ID(s), where the determination does not rely solely on determining EI features or type, or commercial affiliations of EI features or type or locations that the one or more anonymous user ID(s) has/have visited. In some examples, anonymized location data spans time periods when non-anonymized location data (from public records) for online platform 180 is not available (for example, several months). In absence of such non-anonymized location data, location tracking data processing system 122 may have a more comprehensive set of location information (for example, using anonymized location data from anonymized location data storage 284) while also retaining the context of the non-anonymized user. Location tracking data processing system 122 may use such context to determine job classification of user IDs, determine new EI locations and such information.

In another example, location data analyzer 298 may identify that a particular non-anonymous platform user 190 makes daily trips between an active producing well and a corporate office. Job information manager 291 may be aware that the non-anonymous platform user 190 is a site engineer based on navigation information, personal information and job information of the non-anonymous platform user 190 obtained from online platform 180. Location data analyzer 298 may analyze visited location data of an anonymous user ID to identify that the anonymous user ID is making daily trips between the active producing well and the corporate office as well. Location data analyzer 298 may correlate the visited locations of the anonymous user ID and visited locations of the non-anonymous user ID. Based on a correlation in visited locations of the non-anonymous user ID and visited locations of the anonymous user ID, job information manager 291 may use the job information of the non-anonymous user ID as one aspect of determining a job classification of the anonymous user ID (for example, a site engineer).

In some embodiments, job information manager 291 may be configured to use a location geofence and dwell time within the geofence for associating a job classification with an anonymous user ID. Location data analyzer 298 may analyze anonymized location data of the anonymized user ID to determine if the anonymous user ID visited (i.e., entered into) any of the geofences of the known EI features or sites. In response to determining that the anonymous user ID has visited the geofences of one or more known EI features or sites, location data analyzer 298 may determine a dwell time in the visited geofence(s). In one example, location data analyzer 298 may calculate the dwell time by using entry and exit times from a time series of anonymous location data of the anonymous user ID. Based on the dwell time, job information manager 291 may determine an appropriate job classification for the anonymous user ID. For example, location data analyzer 298 may identify that a particular anonymous user ID arrives at a geofenced well undergoing fracking by 9:00 AM and leaves the geofenced well by 18:00 PM. Based on the dwell time of nine (9) hours in the geofenced active producing well, job information manager 291 may classify the anonymous user ID as a frac crew worker.

In some embodiments, job information manager 291 may be configured to determine a frequency of visits of an anonymous user ID within a geofence of known EI feature or site using analysis of anonymized location data of the anonymous user ID for associating a job classification with the anonymous user ID. In one example, location data analyzer 298 may determine the frequency of the visits occurring within the geofence of the known EI feature or site by calculating a number of times the anonymous user ID visits the geofence in a given period of time, for example a day, a week, a month, or so forth. Based on the frequency of visits of the anonymized user ID to the geofenced known EI feature or site, job information manager 291 may determine a job classification for the anonymized user ID, using existing jobs information in job information data storage 288. For example, job information manager 291 may identify based on anonymized location data that an anonymized user ID enters the geofence of an active producing well two days a week. Based on this frequency of visits to within the geofenced active producing well, job information manager 291 may classify the anonymous user ID as a supervisory engineer. In another example, job information manager 291 may identify, based on anonymized location data that a particular anonymous user ID enters the geofence of an active producing well five or six times a day. Based on this frequency of visits within the geofenced active producing well, job information manager 291 may categorize the anonymous user as a fluid transportation truck driver for crude oil transportation.

Information about job classifications and the job information of the job classifications of anonymous user IDs may be used by location tracking data processing system 122 in various ways to improve or supplement EI information that is known to feature recognition system 121 to identify new EI information.

In an example, EI feature determination manager 280 is configured to update EI information based on determined job classifications of anonymous user IDs. Once a job classification has been identified and associated with an anonymous user ID, this may be used by EI feature determination manager 280 in various ways to improve or supplement the EI information that is known (for example, to identify new EI information). In an implementation, EI feature determination manager 280 may take a number of informational inputs, such as anonymized location data, determined job information or classification, and any existing EI information that is known to EI feature determination manager 280 to identify new EI information or new oilfield information. Once new EI information has been determined by EI feature determination manager 280, the new EI information may be stored in EI feature database 230.

In further examples, improving or supplementing EI information of EI feature database 230 may be performed by EI feature determination manager 280. EI feature determination manager 280 may obtain a number of informational inputs, such as anonymized location data, determined job classifications and associated job information, and any existing EI information that is known by feature recognition system 121. New EI information that may be derived may take a variety of forms, examples of which are described in the following embodiments.

According to an implementation, feature recognition system 121 may determine productivity of an EI feature or site. For example, a type or an amount of fluid produced by the EI feature or site based on job classifications of anonymized and non-anonymized user IDs that visit the EI feature or site, the frequency and dwell times of visits and other job information of anonymized and non-anonymized user IDs of various job classifications, the type of the EI feature or site, other known characteristics of the EI feature or site, and so on. For example, the types of fluid may include hydrocarbons, wastewater, or other production chemicals. In an implementation, feature recognition system 121 may use location data of user IDs with determined job classifications to estimate the amount or the volume of fluid (such as wastewater or crude oil) being transferred from the EI feature or site (which may be for example a producing well or associated tank battery) before any related data is known from regulatory filings. For example, location data analyzer 298 may count a number of trips originating at a producing well and made by anonymous user IDs associated with water-carrying truck drivers and may multiply the count by the average truck load volume to determine an estimate of the produced wastewater of the producing well.

In some examples, feature recognition system 121 may determine an amount of fluid received by an EI feature or site based on job classifications of user IDs that visit the EI feature or site, information related to frequency and dwell times of visits of the user IDs with known job classifications that visit the EI feature or site, and information about the EI feature or site, using techniques similar to those described above.

Although the above examples describe processes of determining amounts and locations associated with transported fluids, one can appreciate that the technique is equally applicable for determining amounts of transported non-fluid commodities such as sand, chemicals, bulk metal goods like piping, solid wastes such as drilling mud and other, etc. In examples, where sizeable volumes of fluids are transported between EI features or sites by truck, a development of a pipeline system between such EI features or sites may be feasible and profitable to install. In examples, feature recognition system 121 may be configured to calculate the amount or volume of a type of fluid transported in a given time period (e.g., per day) and may generate recommendations for other methods of transporting the fluid, for example which visualization engine 299 may enable subscriber 195 or administrator 197 to access. In examples, feature recognition system 121 may use information associated with costs of fluid transport per volume, volume of fluid transport between EI features or sites, and cost of pipeline installation, management and operation to provide profitability estimates of different methods of fluid transport (e.g., trucking vs. pipeline) and may provide the estimates to subscriber 195 or administrator 197. For example, based on volume of crude oil produced from, and water received by, a producing well over a period of time, feature recognition system 121 may recommend usage of pipelines or use of trucks for transporting the crude oil and/or water for better profitability.

In one or more embodiments, feature recognition system 121 may use information such as identification of trips made by water truck drivers and which originate at an EI feature or site such as a producing well to identify new EI information indicative of absence of pipeline servicing the producing well. In some implementations, absence of any such identified trips which originate at an EI feature or site such as a producing well, combined with supplemental information (for example, from public skim oil/condensate reports) that wastewater or hydrocarbons are actively being transferred from the producing well may indicate that a water/hydrocarbon pipeline is present and servicing the producing well. Such knowledge is useful to industry participants as it may help the industry participants to identify those locations that have a high potential for cost savings by switching to pipeline transfer methods.

In some examples, feature recognition system 121 may consider the history, for example, of visits of user IDs of one or more job classifications that originated from a known EI feature or site of a given type to improve accuracy or confidence level of new EI information that is determined. In an implementation, information related to visits user IDs of one or more job classifications to a particular EI feature or site may be used by feature recognition system 121 to trigger collection of additional information relating to that particular EI feature or site and which was not previously stored within EI feature database 230. In an example, the additional information related to the EI feature or site that may be collected by feature recognition system 121 may include detailed aerial imagery, regulatory filing information, or information from an in-person inspection. In an example, the type or the nature of the additional information that is triggered to be collected by feature recognition system 121 may further be based on the job information or classification of user IDs that visit one or more EI features or sites.

In an implementation, feature recognition system 121 may generate an analysis of the visited locations over time and may determine a demand for services associated with the one or more EI features or sites based on job classifications associated with the visits, the history of the locations of the visits over time, or the location or productivity of known EI features or sites. In an example, feature recognition system 121 may use determined job information or classifications and anonymized and/or non-anonymized location data from any time period to infer activity levels at EI features or sites, or to infer supply or demand for a product or service at those EI features or sites. For example, having determined a group of anonymous user IDs that are associated with the job classification "sand truck drivers", feature recognition system 121 may monitor the number of trips made from an EI feature known to be a sand mine in a given period of time and sand truck capacity to infer levels of demand for sand in the vicinity of that sand mine. Feature recognition system 121 may store information related to levels of demand for sand in a given region as new EI information. In a similar manner, feature recognition system 121 may monitor activity levels at other know EI features or sites such as at saltwater disposal wells (for example, visits made by water truck drivers) and at midstream terminals or central processing facilities (for example, visits made by oil truck drivers). Such commercial activity information may be compiled by feature recognition system 121 and provided to subscribers 195 to inform them of business opportunities or of general commercial status. The information may be provided to subscribers 195 in the form of a business report or in any other suitable format.

In embodiments, feature recognition system 121 may determine a development status of an EI feature or site based on job classifications of visitors, the location of the EI feature or site, and other information associated with the EI feature or site. In an implementation, feature recognition system 121 may use the determined job information or classification of an anonymized user ID associated with anonymized location data from any time period to determine a development status at a new or emerging EI feature or site. In an example, feature recognition system 121 may detect a plurality of visits being made to a developing drilling site by anonymous user IDs that are associated with sand truck drivers. Feature recognition system 121 may then determine that this activity corresponds to a stockpiling of proppant (sand) and that the commencement of drilling for a new fracture is imminent. In an implementation, feature recognition system 121 may store this information in an EI feature data records 240 associated with the drilling site. A development status of EI may include information about readying or completion of oil facility development, gas facility development, tank battery facility development, disposal well development among other development activities. In some examples, development status includes process completion status of a drilling process, road making process, pipeline laying process, and such processes and completion.

In one or more embodiments, feature recognition system 121 may use the determined job information or classification and the anonymized location data of one or more anonymized user ID from any time period to determine commercial relationships or commercial activity between companies at specific locations. For example, feature recognition system 121 may determine that an anonymized user ID is employed by chemical supply company "X". In an implementation, feature recognition system 121 may also identify, using the anonymized location tracking data, that the same anonymous user ID has visited an emerging EI feature or site (for example, as may have been originally detected by feature recognition system 121 using satellite imagery) and for which a drilling permit application is known to have been filed by operator "Y". Feature recognition system 121 may then be able to determine that a commercial relationship exists between chemical supply company "X" and operator "Y" in relation to the EI feature or site. In an implementation, feature recognition system 121 may store this information in EI feature database 230 and/or use this information as a new EI information.

In a further example, the location tracking data processing system 122 may be configured to detect unauthorized visits to and/or unauthorized destinations after visiting an EI feature, site, or facility. Unauthorized visits and destinations may be indicative of theft, for example. Location data analyzer 298 may be configured to determine whether a user ID, anonymous or non-anonymous, has conducted an unauthorized visit to an EI feature, site, or facility. An unauthorized visit may include a visit at an unauthorized time (e.g., at night), a visit by an unauthorized user (e.g., a user ID not having permission to be on site), and/or an unscheduled visit by an authorized user during operating hours. Unauthorized destinations may include destinations that are non-approved and/or unexpected visited by a user ID after visiting the EI feature, site, or facility. Such an unauthorized destination indicate, for example, that an approved user has dropped off product at an unapproved location. When such an unauthorized visit or unauthorized destination is detected, location tracking data processing system 122 may be configured to identify a platform user 190. When such an unauthorized visit or unauthorized destination is detected, location tracking data processing system 122 may be configured to conduct an audit of the activities of the anonymous user ID associated with the unauthorized visit or destination. Although the anonymous user ID is anonymous, the location and timing of an unexpected destination (or destination following an unauthorized visit) may permit the identification of a facility to which a substance was transported and subsequent identification of the anonymous user ID.

In a further example, the location tracking data processing system 122 may be configured to detect a lack of an expected visit and/or expected destination after visiting an EI feature, site, or facility. A lack of expected visits and destinations may be indicative of fraud, for example. A lack of an expected visit may include a visit to a site, e.g., a water disposal site that was scheduled or reported and never occurred. Such may be determined because no user IDs visited during the scheduled/reported time or because a user ID expected to arrive from a specific EI feature, site, or facility did not arrive. In another example, a user ID that failed to visit a specific destination (e.g., an authorized water disposal site) after visiting an EI feature, site, or facility (a well) may indicate that a job was not completed satisfactorily, i.e., the transported water was improperly disposed of.

In a further example, the location tracking data processing system 122 may be configured to detect accidents or other incidents. For example, location data of anonymous and non-anonymous user IDs may be compared to locations of detected methane or other VOC emissions (detectable, e.g., via satellite), spills, or other evidence of improper materials handling. Such comparisons may be employed to determine which workers, facilities, and/or companies are failing to comply with appropriate ESG standards.

In a further example, the location tracking data processing system 122 may be configured to estimate or determine emissions associated with a specific EI feature or facility and/or an operator of such a feature or facility. The location tracking data processing system 122 may be configured to identify all trips to and from a specific EI feature or facility by a specific job classification or multiple specific job classifications. The location tracking data processing system 122 may be further configured to estimate carbon dioxide ($CO_2$) emissions associated with the identified trips. Different job classifications may be associated with differing amounts of estimated $CO_2$ emissions. For example, the trips of a wastewater disposal truck driver may be associated with a higher volume of $CO_2$ emissions than the trips of a site manager or inspector. Based estimates of $CO_2$ emissions associated with some or all trips to and from a specific EI feature or facility, an aggregate amount of $CO_2$ emissions associated with that facility may be estimated or determined. The aggregate amount of $CO_2$ emissions may further be associated with an operator of the facility and/or the operator of multiple facilities.

In another example, the location tracking data processing system 122 may be configured to detect various prohibited behaviors. Many companies keep and track non-anonymous user ID location data, for example, via GPS devices installed in company-owned trucks. The location tracking data processing system 122 may be configured to compare anonymous user ID location data to the non-anonymous user ID location data to detect prohibited or illicit behavior occurring when the non-anonymous user ID location data is not kept. High correlation between the locations of these two separate sets of location data may indicate that each belongs to the same worker. In an example, if a worker turns off their GPS device to visit a bar or that visits a bar prior to coming to work may still be tracked via anonymized location, the location tracking data processing system 122 may detect this behavior. Other types of illicit or prohibited behavior may be detected through a comparison of anonymized and non-anonymized location data.

In a further example, the location tracking data processing system 122 may be configured optimize maintenance travel and identify faulty or poorly performing equipment. Wellsite maintenance personnel, often called "pumpers," visit wellsites for maintenance purposes. Those user IDs classified as pumpers may be tracked between various wellsites and the results used for maintenance optimization. For example, travel patterns of visits by pumpers to and from different well sites may be analyzed and optimized to increase the efficiency of travel routes and visit timing. In another example, visit frequencies may be analyzed to identify equipment that requires unusually frequent maintenance visits. Such information may be indicative of new business opportunities for service and equipment companies to offer newer or better equipment and service to reduce maintenance costs and visits. Such information may also be used by operators to identify wellsite locations most in need of upgraded service or equipment to reduce excess maintenance visits and costs.

Once the new EI information has been determined (and as represented by the dotted line feedback arrow of FIG. 2B), this may be used to EI feature records 240 in EI feature database 230.

Figure 3:
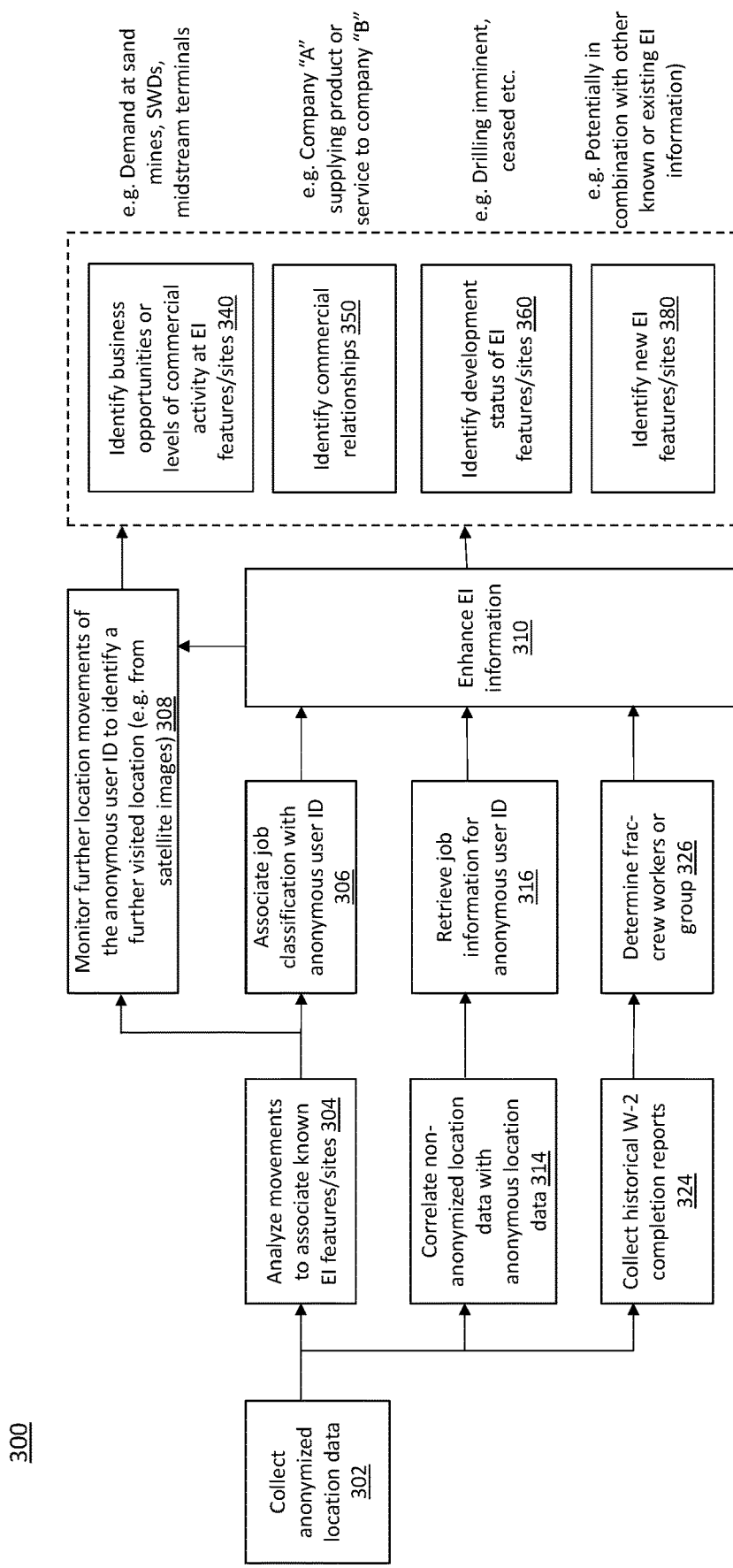
FIG. 3 depicts a flowchart for identifying existence, characteristics, and status of EI, relationships between EI features, activity at or between EI features, and business opportunities thereof using anonymous location data in correlation with EI feature information, according to some embodiments.

FIG. 3 is a flow chart 300 illustrating how the rules based technological solutions using anonymous location data in correlation with EI information may be implemented for developing new business opportunities. The steps of flowchart 300 may represent a computer implemented method to be performed by at least one processor. Flow chart 300 illustrates three methodologies that process anonymous location data to enhance EI information to develop new business opportunities. A first methodology describes enhancing EI information based on correlating anonymized location data with the location of the known EI features/sites. The first methodology is described in steps 302-310.

In step 302, anonymized location data may be collected. In one embodiment, location tracking data processing system 122 may collect anonymized location data from anonymized location data source 182. The anonymized location data may include visited locations associated with an anonymous user ID. In step 304, movements of the anonymous user ID are analyzed in the anonymized location data by location data analyzer 298 to determine whether the anonymous user ID visited any locations of known EI features/sites, e.g., exceeded a dwell time within the geofence of the known EI feature/site. Data combination manager 297 may associate visited locations of the anonymous user ID determined by location data analyzer 298 with locations and identification of known EI features/sites. In step 306, a job classification may be associated with the anonymous user ID by job information manager 291 based on a correlation between the visited locations, the location of the known EI feature/site, and other information of the known EI feature/site. In step 308, location movements of the anonymous user ID may be monitored by location data analyzer 298 to identify further visited locations. In one embodiment, location data analyzer 298 may perform the analysis of the anonymized location data to monitor the movements of anonymous user ID. If the further visited locations are frequented by the anonymous user ID, the further visited locations may indicate a new EI feature/site that was not previously known. In step 310, EI information for the EI feature/site may be enhanced based on the movements and job classification of the anonymous user ID. Identifying new EI feature/site related information that is not previously known may present new business opportunities, for example within the oil and gas industry, for example, oilfield operators, water or crude oil transportation companies, equipment suppliers, financial institutions and so on. Such information may not be available publicly or previously known. Feature recognition system 121 using the system and methods described provides such information by processing anonymous location data with EI feature/site information associated with a known oilfield facility.

FIG. 3 illustrates a second methodology describes retrieving non-anonymized location data and job classification and information associated with a non-anonymous user ID and correlating this information anonymized location data associated with an anonymous user ID. The second methodology is described in steps 302, and 314-316.

As described above, in step 302, anonymized location data may be collected. In step 314, the anonymized location data may be correlated against non-anonymized location data associated with a non-anonymous user ID. The non-anonymized location data may be obtained from non-anonymized location data storage 286. In step 316, based on correlation, job classification information associated with the non-anonymous user ID is retrieved and associated with the anonymous user ID. The job classification associated with the non-anonymous user ID may be used to enhance EI information in step 310.

FIG. 3 illustrates a third methodology describing and example of determining job classifications of a group of anonymized user ID. A non-limiting example of determining job classifications, for example, frac crew workers, from non-anonymous user ID based on historical records, such as completion reports, is described in steps 302, and 324-326. In step 302, anonymized location data may be collected. In step 324, public records 260, for example, historical completion reports (for example W-2) may be collected. The historical completion reports may provide information on a completed well location or other EI facility/site. Location data analyzer 298 may be configured to retrieve historical anonymized location data from the same time period as the reported well completion to identify which anonymized user IDs were present in the location of the EI site, e.g., the completed well, during that time. Based on the identification, in step 326, the anonymized user IDs may be classified, for example, as potential frac crew workers and may be associated with each other as a frac crew. In one example, the classification may be performed by job information manager 291. The job information associated with the non-anonymous user IDs (frac crew) may be used to enhance EI information in step 310. This enhanced information may be provided to step 308 to identify EI feature locations not known before based on the non-anonymized user IDs visiting other locations and optionally other EI information such as satellite images.

Based on identified new EI feature locations (step 308) and enhanced EI information (step 310), new business opportunities or levels of commercial activity may be identified at EI features/sites. For example, based on newly identified oilfield location that was not known, feature recognition system 121 may identify potential opportunities, including development activity and gaps in infrastructure, such as fuel stations for fueling transportation trucks, truck depots for parking trucks during rest hours, service stations for repair or service of transportation trucks and heavy machinery, restaurants for food supply to oilfield employees, opportunities to set up pipelines for transportation of crude oil, fresh water and waste water, real estate opportunities for housing employees, and other business opportunities. In examples, levels of commercial activity including supply or demand may be determined for a product or service at known locations based on activity levels. For example, demand at sand mines, SWDs and midstream terminals may be determined in step 340. Commercial activity information may be compiled by feature recognition system and delivered to subscribers 195 or administrator 197 to inform them of business opportunities or of general commercial status in step 340.

Based on identified new EI feature/site locations (step 380) and enhanced EI information (step 310), commercial relationships or commercial activity between companies at specific locations may be identified. For example, location tracking data processing system 122 may determine that an anonymous user ID is employed by chemical supply company "AB". Feature recognition system 121 may also determine that the anonymous user ID has visited an emerging fracturing site for which a drilling permit application is known to have been filed by operator "BC". Feature recognition system 121 may determine that a commercial relationship exists between chemical supply company "AB" and operator "BC" in relation to a drilling activity at that location. Feature recognition system 121 may store and/or use this information as a new oilfield information. Commercial relationships or commercial activity between companies at specific locations may be compiled by feature recognition system 121 and delivered to its subscribers 195 in step 350. In another example, feature recognition system 121 may identify product and/or service providing companies supporting EI. For example, based on known information such may be determined using public regulatory records that show the name of a company providing services (for example, a truck parking company or a machine servicing company), feature recognition system 121 may use the commercial relationships or commercial activity between companies to identify supply chain relationships and market shares between service buyers and service providers.

Based on identified new EI feature/site locations (step 308) and enhanced EI information (step 310), status of development of EI features/sites may be determined. For example, development status such as information about readying or completion of oil facility development, gas facility development, tank battery facility development, disposal well development among developmental activities may be determined in step 360.

Based on identified new EI feature/site locations (step 308) and enhanced EI information (step 310), further new EI features/sites may be identified in step 380. For example, analysis of new EI feature/site locations, enhanced EI information including new EI job information of anonymous user IDs and further visited locations of anonymous user IDs, further new EI features/sites may be identified.

FIG. 4, FIG. 5, FIG. 6 and FIG. 7 illustrate various process flows that utilize the aspects of the disclosures previously described in detail.

Figure 4:
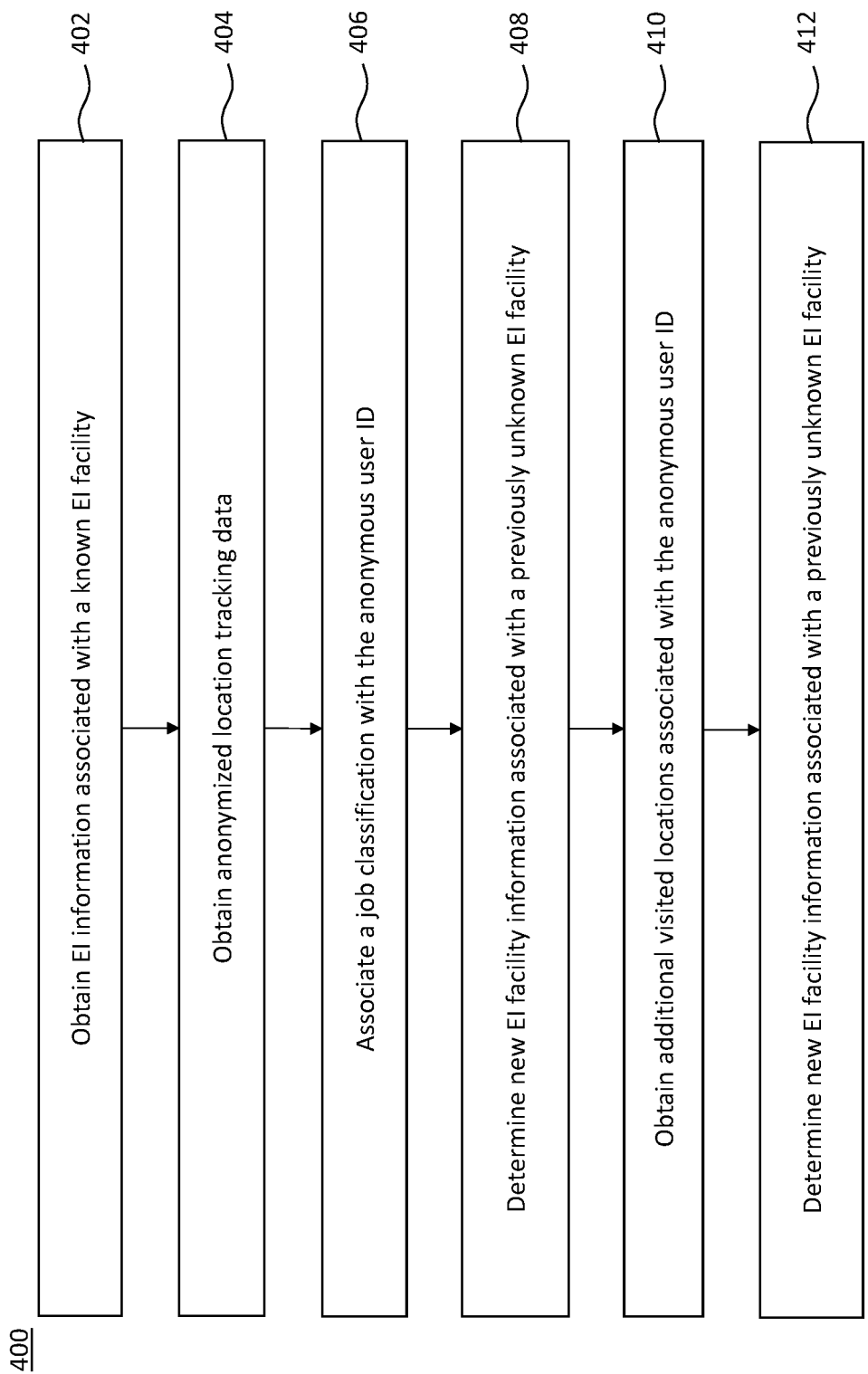
FIG. 4 depicts a flowchart for determining job classifications of anonymous user IDs, and identifying new EI facility information, according to some embodiments.

FIG. 4 depicts flowchart 400 for determining job classifications of anonymous user IDs, and identifying new EI feature or facility information, according to some embodiments. The steps of flowchart 400 may represent a computer implemented method to be performed by at least one processor. Step 402 includes obtaining EI information associated with a known EI feature or facility. The EI feature or facility information includes a location of a known EI feature or facility and an identification of the known EI feature or facility. Step 404 includes obtaining anonymized location tracking data. Anonymized location tracking data may also be referred to as anonymized location data or location data of an anonymized user ID. The anonymized location tracking data includes visited locations associated with an anonymous user ID. Step 406 includes associating a job classification with the anonymous user ID based on a correlation between the visited locations, the location of the known EI feature or facility, and the identification of the known EI feature or facility. Step 408 includes determining, based on the visited locations and the job classification of the anonymous user ID, new EI feature or facility information associated with a previously unknown EI feature or facility, the new EI feature or facility information including a location of the previously unknown EI feature or facility. Step 410 includes obtaining including additional visited locations associated with the anonymous user ID as part of the anonymized location tracking data. Step 412 includes determining, based on the additional visited locations and the job classification of the anonymous user ID, new EI feature or facility information associated with a previously unknown EI feature or facility, the new EI feature or facility information including a location of the previously unknown EI facility.

Figure 5:
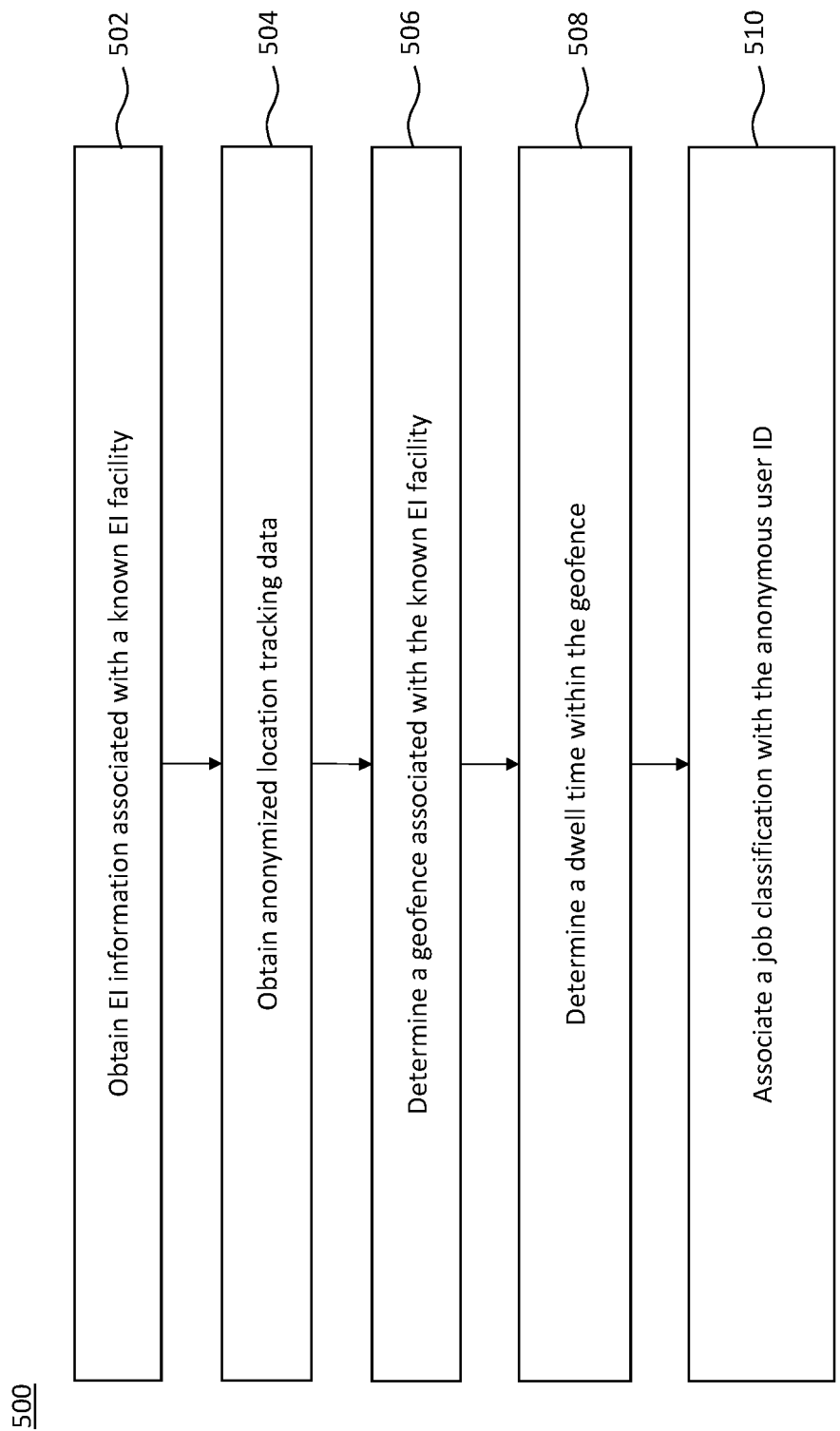
FIG. 5 depicts a flowchart for determining job classifications of anonymous user IDs based on visited locations occurring within a geofence, according to some embodiments.

FIG. 5 depicts flowchart 500 for determining job classifications of anonymous user IDs based on visited locations occurring within a geofence, according to some embodiments. The steps of flowchart 500 may represent a computer implemented method to be performed by at least one processor. Step 502 includes obtaining EI information associated with a known EI feature or facility, the EI feature or facility information including a location of the known EI feature or facility and an identification of the known EI feature or facility. Step 504 includes obtaining anonymized location tracking data, the anonymized location tracking data including visited locations associated with an anonymous user ID. Step 506 includes determining a geofence associated with the known EI feature or facility. Step 508 includes determining a dwell time within the geofence based on the visited locations and a frequency of the visited locations occurring within the geofence. Step 510 includes associating a job classification with the anonymous user ID based on a correlation between the visited locations, the location of the known EI feature or facility, the identification of the known EI feature or facility, and based on the dwell time within the geofence and/or the frequency of the visited locations occurring within the geofence.

Figure 6:
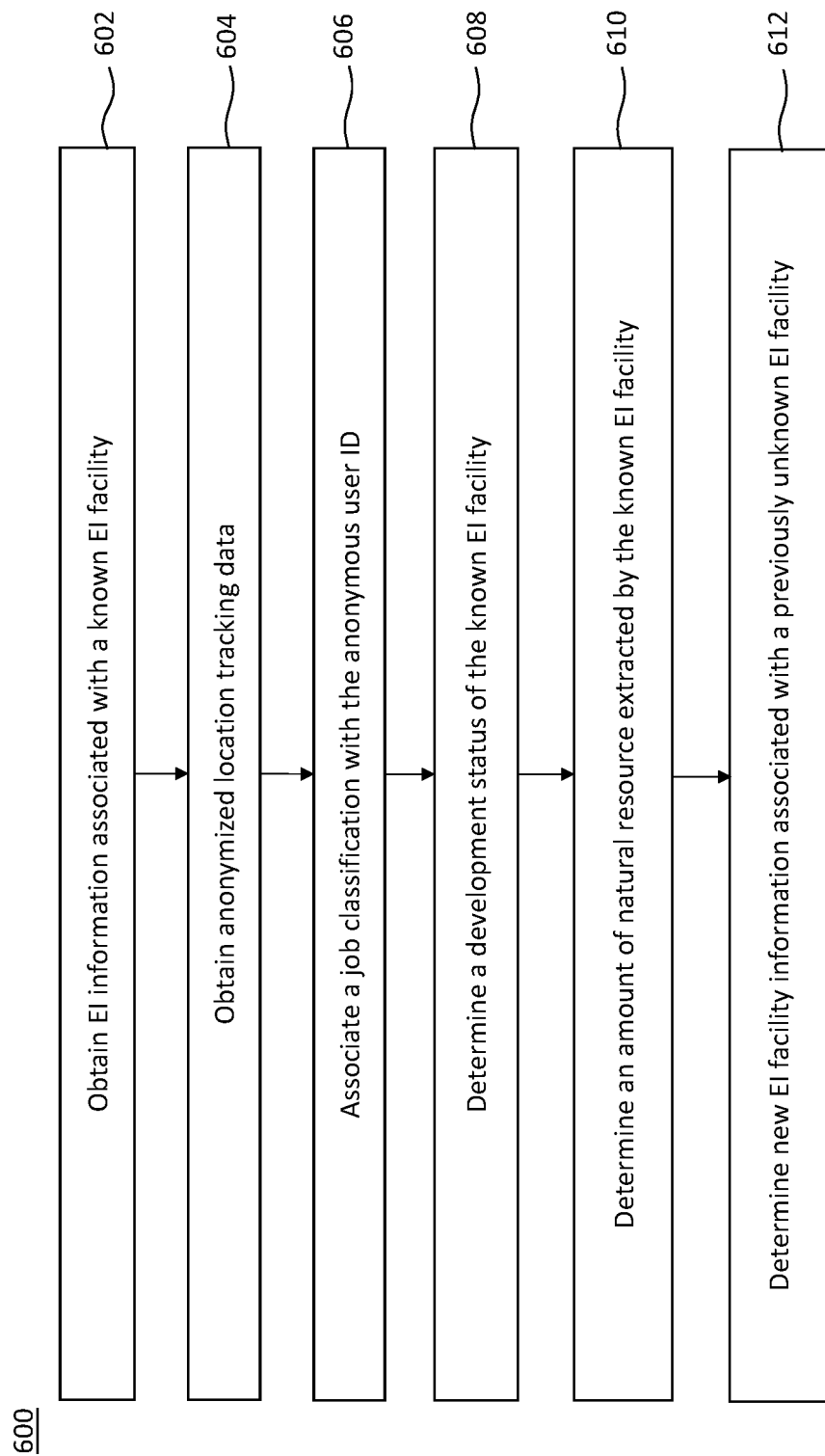
FIG. 6 depicts a flowchart for identifying and determining characteristics and status of EI based on location data, according to some embodiments.

FIG. 6 depicts flowchart 600 for identifying and determining characteristics and status of EI based on location data, according to some embodiments. The steps of flowchart 600 may represent a computer implemented method to be performed by at least one processor. Step 602 includes obtaining EI information associated with a known EI feature or facility, the EI feature or facility information including a location of the known EI feature or facility and an identification of the known EI feature or facility. Step 604 includes obtaining anonymized location tracking data, the anonymized location tracking data including visited locations associated with an anonymous user ID. Step 606 includes associating a job classification with the anonymous user ID based on a correlation between the visited locations, the location of the known EI feature or facility, and the identification of the known EI feature or facility. Step 608 includes determining a development status of the known EI feature or facility based on the job classification, the visited locations, the location of the known EI feature or facility, and the identification of the known EI feature or facility. Step 610 includes determining an amount of natural resource extracted by the known EI feature or facility based on the job classification, the visited locations, the location of the known EI feature or facility, and the identification of the known EI feature or facility. Step 612 includes determining a method of fluid transport employed at the known EI feature or facility based on the job classification, the visited locations, the location of the known EI feature or facility, the identification of the known EI feature or facility, and an amount of natural resource extracted by the known EI feature or facility.

Figure 7:
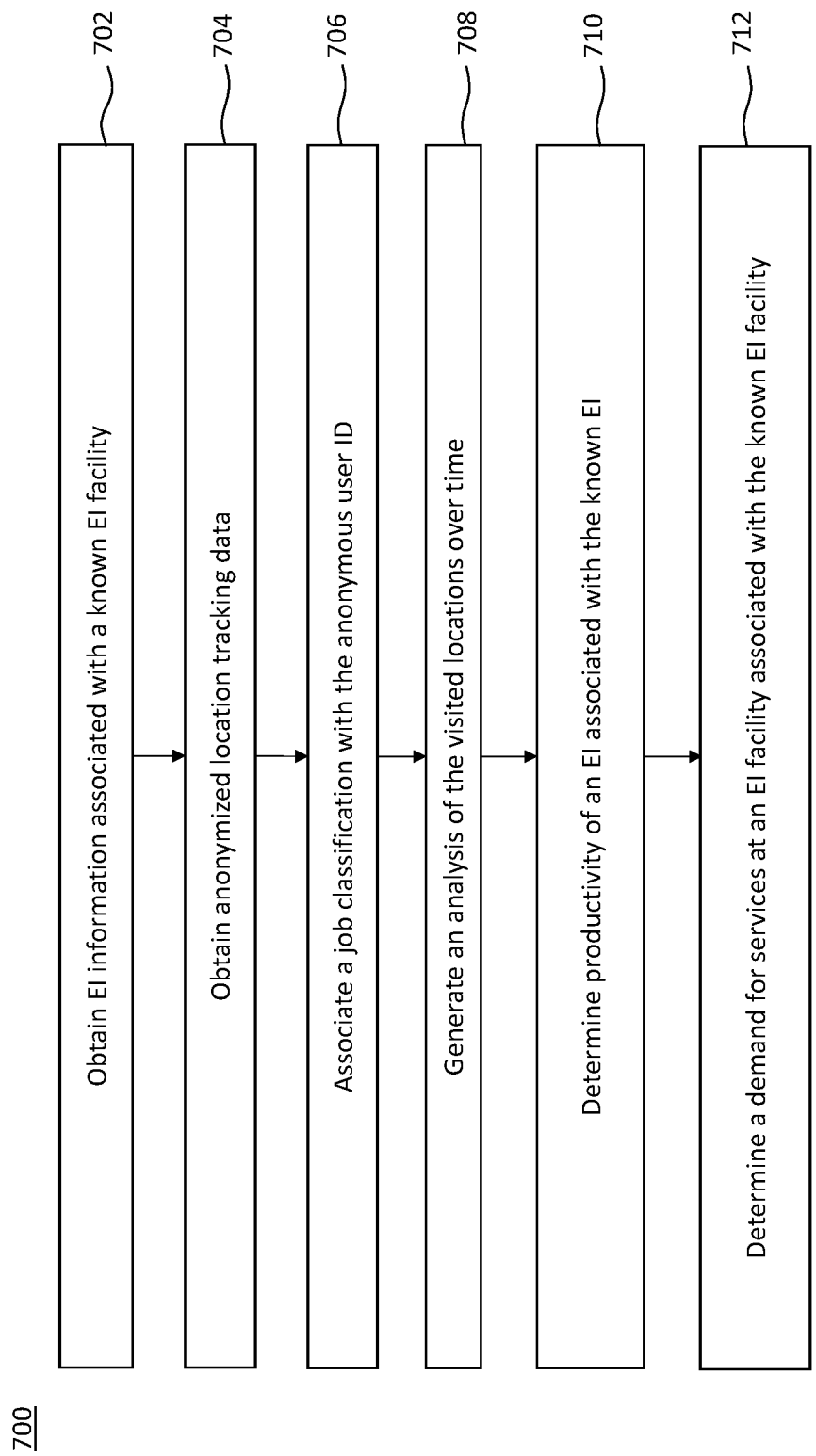
FIG. 7 depicts a flowchart for determining productivity and a demand for services at the EI, according to some embodiments.

FIG. 7 depicts flowchart 700 for determining job classifications of anonymous user IDs, according to some embodiments. The steps of flowchart 700 may represent a computer implemented method to be performed by at least one processor. Step 702 includes obtaining EI information associated with a known EI feature or facility, the EI feature or facility information including a location of the known EI feature or facility and an identification of the known EI feature or facility. Step 704 includes obtaining anonymized location tracking data, the anonymized location tracking data including visited locations associated with an anonymous user ID. Step 706 includes associating a job classification with the anonymous user ID based on a correlation between the visited locations, the location of the known EI feature or facility, and the identification of the known EI feature or facility. Step 708 includes generating an analysis of the visited locations over time. Step 710 includes determining productivity of an EI associated with the known EI feature or facility based on the job classification, the analysis of the visited locations over time, the location of the known EI feature or facility, the identification of the known EI feature or facility and an amount of natural resource extracted by the known EI feature or facility. Step 712 includes determining a demand for services at an EI facility associated with the known EI feature or facility based on the job classification, the analysis of the visited locations over time, the location of the known EI facility, the identification of the known EI feature or facility, and an amount of natural resource extracted by the known EI feature or facility.

The above systems, devices, methods, processes, and the like may be realized in hardware, software, machinery or any suitable combination of these. The hardware may include a general-purpose computer and/or dedicated computing device. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. In another aspect, the methods may be embodied in systems that perform the steps thereof and may be distributed across devices in several ways. At the same time, processing may be distributed across devices such as the various systems described above, or all the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

Embodiments disclosed herein may include computer program products comprising computer-executable code or computer-usable code that, when executing on one or more computing devices, performs any and/or all the steps thereof. The code may be stored in a non-transitory fashion in a computer memory, which may be a memory from which the program executes (such as random-access memory associated with a processor), or a storage device such as a disk drive, flash memory or any other optical, electromagnetic, magnetic, infrared or other device or combination of devices. In another aspect, any of the systems and methods described above may be embodied in any suitable transmission or propagation medium carrying computer executable code and/or any inputs or outputs from same.

The method steps of the implementations described herein are intended to include any suitable method of causing such method steps to be performed, consistent with the patentability of the following claims, unless a different meaning is expressly provided or otherwise clear from the context. So, for example performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity and need not be located within a particular jurisdiction.

It will be appreciated that the devices, systems, and methods described above are set forth by way of example and not of limitation. Absent an explicit indication to the contrary, the disclosed steps may be modified, supplemented, omitted, and/or re-ordered without departing from the scope of this disclosure. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the disclosure as defined by the following claims, which are to be interpreted in the broadest sense allowable by law.

It shall be appreciated that any part or process of the system may utilize deterministic algorithms or procedures or may be non-deterministic and instead based on artificial intelligence and/or other machine learning processes. Any part or process of the system may be implemented as software or firmware or other instruction code executed on a processor or other suitable computing platform. Any part or process of the system may additionally or alternatively be based on a reconfigurable or non-reconfigurable hardware implementation. Components of the system may include one or more servers and one or more client devices. Functionality or processes of the system may be performed or executed in a centralized fashion within either a server or a client device, or in a distributed fashion across a plurality of servers or a plurality of client devices. In further examples, functionality or processes of the system may be performed, executed or shared between a server and a client device.

While some examples of the system described above are based on the use of anonymized location data, it shall be appreciated that the concepts disclosed may also apply in cases in which the location data is only partially anonymized (for example, only some user-based information has been removed), or on location data that has not been anonymized at all (for example, no user-based information has been removed). For example, the system may operate on non-anonymized location data in which the user-based information comprises only a name, address and telephone number, and does not contain any job information regarding the user. In such a case, it shall be understood that the concepts disclosed above remain equally applicable.

The examples of the systems and methods as described above are provided for illustrative purposes only and are not intended in any way to limit the scope or applicability of the present disclosure.

The invention claimed is:

1. A computer implemented method of determining job classifications of anonymous users, the method comprising:
    obtaining Energy Infrastructure (EI) information associated with a known EI facility, the EI facility information including a location of the known EI facility and an identification of the known EI facility;
    obtaining anonymized location tracking data, the anonymized location tracking data including visited locations associated with an anonymous user ID;
    associating a job classification with the anonymous user ID based on a correlation between the visited locations, the location of the known EI facility, and the identification of the known EI facility
    obtaining including additional visited locations associated with the anonymous user ID as part of the anonymized location tracking data; and
    determining, based on the additional visited locations and the job classification of the anonymous user ID, new EI facility information associated with a previously unknown EI facility, the new EI facility information including a location of the previously unknown EI facility.

2. The computer implemented method of claim 1, further comprising:
    determining, based on the visited locations and the job classification of the anonymous user ID, new EI facility information associated with a previously unknown EI facility, the new EI facility information including a location of the previously unknown EI facility.

3. The computer implemented method of claim 2, wherein the new EI facility information further includes an identification of the previously unknown EI facility.

4. The computer implemented method of claim 1, further comprising determining a development status of the known EI facility based on the job classification, the visited locations, the location of the known EI facility, and the identification of the known EI facility.

5. The computer implemented method of claim 1, further comprising determining an amount of substance produced by, disposed by, or delivered to the known EI facility based on the job classification, the visited locations, the location of the known EI facility, and the identification of the known EI facility.

6. The computer implemented method of claim 1, further comprising determining a method of fluid transport employed at the known EI facility based on the job classification, the visited locations, the location of the known EI facility, and the identification of the known EI facility.

7. The computer implemented method of claim 1, further comprising:
generating an analysis of the visited locations over time; and
determining productivity of an EI associated with the known EI facility based on the job classification, the analysis of the visited locations over time, the location of the known EI facility, the identification of the known EI facility and an amount of substance produced by, disposed by, delivered to, or extracted by the known EI facility.

8. The computer implemented method of claim 1, further comprising:
generating an analysis of the visited locations over time; and
determining a demand for services at an EI facility associated with the known EI facility based on the job classification, the analysis of the visited locations over time, the location of the known EI facility, the identification of the known EI facility, and an amount of substance produced by, disposed by, or delivered to the known EI facility.

9. The computer implemented method of claim 1, further comprising:
obtaining non-anonymized location tracking data; and
obtaining a known job classification of a non-anonymous user ID;
wherein associating the job classification with the anonymous user ID is further based on a correlation between the visited locations of the anonymous user ID and visited locations of the non-anonymous user ID.

10. The computer implemented method of claim 1, further comprising:
determining a geofence associated with the known EI facility; and
determining a dwell time within the geofence based on the visited locations,
wherein associating a job classification with the anonymous user ID is further based on the dwell time within the geofence.

11. The computer implemented method of claim 1, further comprising:
determining a geofence associated with the known EI facility; and
determining a frequency of the visited locations occurring within the geofence,
wherein associating a job classification with the anonymous user ID is further based on the frequency.

12. A system for determining job classifications of anonymous users, the system comprising:
a computer memory storing instructions; and
a processor configured to execute the instructions to:
obtain Energy Infrastructure (EI) facility information associated with a known EI facility, the EI facility information including a location of the known EI facility and an identification of the known EI facility;
obtain anonymized location tracking data, the anonymized location tracking data including visited locations associated with an anonymous user ID;
associate a job classification with the anonymous user ID based on a correlation between the visited locations, the location of the known EI facility, and the identification of the known EI facility;
obtain additional visited locations associated with the anonymous user ID as part of the anonymized location tracking data; and
determine, based on the additional visited locations and the job classification of the anonymous user ID, new EI facility information associated with a previously unknown EI facility, the new EI facility information including a location of the previously unknown EI facility.

13. The system of claim 12, wherein the processor is further configured to execute instructions to:
determine, based on the visited locations and the job classification of the anonymous user ID, new EI facility information associated with a previously unknown EI facility, the new EI facility information including a location of the previously unknown EI facility.

14. The system of claim 13, wherein the new EI facility information further includes an identification of the previously unknown EI facility.

15. The system of claim 12, wherein the processor is further configured to execute instructions to determine a development status of the known EI facility based on the job classification, the visited locations, the location of the known EI facility, and the identification of the known EI facility.

16. The system of claim 12, wherein the processor is further configured to execute instructions to determine an amount of substance produced by, disposed by, or delivered to the known EI facility based on the job classification, the visited locations, the location of the known EI facility, and the identification of the known EI facility.

17. The system of claim 12, wherein the processor is further configured to execute instructions to determine a method of fluid transport employed at the known EI facility based on the job classification, the visited locations, the location of the known EI facility, the identification of the known EI facility, and an amount of substance produced by, disposed by, or delivered to the known EI facility.

18. A non-transitory computer readable medium storing computer instructions that, when executed by a processor, cause the processor to execute a method of determining job classifications of anonymous users, the method comprising:
obtaining Energy Infrastructure (EI) facility information associated with a known EI facility, the EI facility information including a location of the known EI facility and an identification of the known EI facility;
obtaining anonymized location tracking data, the anonymized location tracking data including visited locations associated with an anonymous user ID;
associating a job classification with the anonymous user ID based on a correlation between the visited locations, the location of the known EI facility, and the identification of the known EI facility;

obtaining including additional visited locations associated with the anonymous user ID as part of the anonymized location tracking data; and determining, based on the additional visited locations and the job classification of the anonymous user ID, new EI facility information associated with a previously unknown EI facility, the new EI facility information including a location of the previously unknown EI facility.

* * * * *